(12) United States Patent
Ide

(10) Patent No.: US 7,684,303 B2
(45) Date of Patent: *Mar. 23, 2010

(54) READ-ONLY OPTICAL RECORDING MEDIUM ON WHICH UNIQUE IDENTIFICATION INFORMATION IS WRITTEN

(75) Inventor: Naoki Ide, Tokyo (JP)

(73) Assignee: Sony Corporation, Tokyo (JP)

( * ) Notice: Subject to any disclaimer, the term of this patent is extended or adjusted under 35 U.S.C. 154(b) by 679 days.

This patent is subject to a terminal disclaimer.

(21) Appl. No.: 11/578,554

(22) PCT Filed: Apr. 8, 2005

(86) PCT No.: PCT/JP2005/006954

§ 371 (c)(1),
(2), (4) Date: Oct. 16, 2006

(87) PCT Pub. No.: WO2005/104105

PCT Pub. Date: Nov. 3, 2005

(65) Prior Publication Data

US 2007/0274177 A1   Nov. 29, 2007

(30) Foreign Application Priority Data

Apr. 21, 2004   (JP) .............................. 2004-125893

(51) Int. Cl.
   *G11B 20/10*   (2006.01)
(52) U.S. Cl. .............. 369/59.24; 369/53.21; 369/275.3; 369/275.4
(58) Field of Classification Search ........................ None
   See application file for complete search history.

(56) References Cited

U.S. PATENT DOCUMENTS

2003/0002406 A1 * 1/2003 Deguchi et al. ............ 369/47.3
2003/0152009 A1 * 8/2003 Usui et al. ............... 369/59.25

FOREIGN PATENT DOCUMENTS

| JP | 2001-094543 | 4/2001 |
|----|-------------|--------|
| JP | 2002-500796 | 1/2002 |

(Continued)

OTHER PUBLICATIONS

U.S. Appl. No. 10/592,487, filed Sep. 12, 2006, Ide.

Primary Examiner—Wayne R Young
Assistant Examiner—Brian Butcher
(74) Attorney, Agent, or Firm—Oblon, Spivak, McClelland, Maier & Neustadt, L.L.P.

(57) ABSTRACT

A method for recording a unique ID to a read-only optical disk adopts the 1-7 PP modulation technique and provides in a plurality of predetermined positions postscript areas each having a predetermined postscript pattern. The postscript pattern takes a form of 3T (pit)-2T (land)-3T (pit) and has a length of 8T (largest code length of a modulated bit string). Modulated bit strings before and after the 3T-2T-3T postscript pattern are formed so that the pit-land-pit postscript pattern complies with the rule of the variable-length modulation even when it is replaced as a whole with a pit-only pattern. Further, the land in the middle will not physically change when irradiated with laser light having a reading-level power, but will be melted with a power higher than the reading-level one.

39 Claims, 22 Drawing Sheets

| termination 2bits | polarity control 2bits | UID bits 8bits | parity 2 |
|---|---|---|---|

| 01 10 11 | 01 10 11 | 01000001 | 00 01 10 11 |

| Determination of preceding polarity | Bit selection corresponding to polarity | 010 - 010 - 100 - 100 ↓ NRZ-NRZI conversion 001 - 110 - 011 - 100 └─┬─┘ 3T -2T- 3T |

FOREIGN PATENT DOCUMENTS

| | | |
|---|---|---|
| JP | 2002-260286 | 9/2002 |
| JP | 2003-196837 | 7/2003 |
| JP | 2004 5919 | 1/2004 |
| JP | 2004 87082 | 3/2004 |
| JP | 2005 78212 | 3/2005 |
| WO | WO 02/101733 | 12/2002 |

* cited by examiner

| | codeword 0 | codeword 1 | codeword L | | codeword 302 | codeword 303 |
|---|---|---|---|---|---|---|
| | e0,0 | e0,1 | e0,L | | e0,302 | e0,303 |
| | e1,0 | e1,1 | e1,L | | e1,302 | e1,303 |
| | e2,0 | e2,1 | e2,L | | e2,302 | e2,303 |
| | . . | . . | . . | | . . | . . |
| | e215,0 | e215,1 | e215,L | | e215,302 | e215,303 |
| | p216,0 | p216,1 | p216,L | | p216,302 | . . |
| | . . | . . | . . | | . . | . . |
| | p247,0 | p247,1 | p247,L | | p247,302 | p247,303 |

← 304 columns →

216 rows with data 32 rows with parity

1 LDC codeword = 248 bytes

FIG. 3

|  | codeword 0 | codeword 1 | codeword L | | codeword 22 | codeword 23 |
|---|---|---|---|---|---|---|
| | b0,0 | b0,1 | b0,L | | b0,22 | b0,23 |
| | b1,0 | b1,1 | b1,L | | b1,22 | b1,23 |
| | b2,0 | b2,1 | b2,L | | b2,22 | b2,23 |
| | : | : | : | | : | : |
| | : | : | : | | : | : |
| | b29,0 | b29,1 | b29,L | | b29,22 | b29,23 |
| | p30,0 | p30,1 | p30,L | | p30,22 | p30,23 |
| | : | : | : | | : | : |
| | : | : | : | | : | : |
| | p61,0 | p61,1 | p61,L | | p61,22 | p61,23 |

← 24 columns →

30 rows with data 32 rows with parity

1 BIS codeword = 62 bytes

FIG. 4

| Physical cluster 496*1932 cbs | Linking 1932 cbs | Linking 1932 cbs | Physical cluster 496*1932 cbs | Linking 1932 cbs | Linking 1932 cbs | Physical cluster 496*1932 cbs |

FIG.5

| Frame Sync 20 | data 624 | data 32 | UID 12 | dc control 2 | data 644 | data 32 | UID 12 | dc control 2 |
|---|---|---|---|---|---|---|---|---|
| Frame Sync 20 | data 624 | data 32 | UID 12 | dc control 2 | data 644 | data 32 | UID 12 | dc control 2 |
| Frame Sync 20 | data 624 | data 32 | UID 12 | dc control 2 | data 644 | data 32 | UID 12 | dc control 2 |

FIG.10

| Frame Sync 20 | data 1222 | data 32 | UID 12 | dc control 2 |
| --- | --- | --- | --- | --- |
| Frame Sync 20 | data 1222 | data 32 | UID 12 | dc control 2 |
| Frame Sync 20 | data 1222 | data 32 | UID 12 | dc control 2 |

FIG.11

| data bits | modulation bits |
|---|---|
| 00 00 00 00 | 010 100 100 100 |
| 00 00 10 00 | 000 100 100 100 |
| 00 00 00 | 010 100 000 |
| 00 00 01 | 010 100 100 |
| 00 00 10 | 000 100 000 |
| 00 00 | 000 100 100 |
| 00 01 | 000 100 |
| 00 10 | 010 000 |
| 00 11 | 010 100 |
| 01 | 010 |
| 10 | 001 |
| 11 (xx1-) | 000 |
| (xx0-) | 101 |
| 11 01 11 | 001 000 000 |
| 00 00 (-fs) | 010 100 |
| 00 (-fs) | 000 |

FIG. 12

| sync-N | sync | sync-ID |
|---|---|---|
| FS0 | #01 010 000 000 010 000 000 010 | 000 001 |
| FS1 | #01 010 000 000 010 000 000 010 | 010 010 |
| FS2 | #01 010 000 000 010 000 000 010 | 101 000 |
| FS3 | #01 010 000 000 010 000 000 010 | 100 001 |
| FS4 | #01 010 000 000 010 000 000 010 | 000 100 |
| FS5 | #01 010 000 000 010 000 000 010 | 001 001 |
| FS6 | #01 010 000 000 010 000 000 010 | 010 000 |
| FS7 | #01 010 000 000 010 000 000 010 | 100 000 |
| FS8 | #01 010 000 000 010 000 000 010 | 101 010 |

FIG.13

| termination 2bits | polarity control 2bits | UID bits 8bits | parity 2 |
|---|---|---|---|
| 01 10 11 | 01 10 11 | 01000001 | 00 01 10 11 |

| Determination of preceding polarity | Bit selection corresponding to polarity | 010 - 010 - 100 - 100<br>↓ NRZ-NRZI conversion<br>001 - 110 - 011 - 100<br>3T -2T- 3T |
|---|---|---|

FIG.14

| 1st column | 2nd column | | 3rd column | | 4th column | |
|---|---|---|---|---|---|---|
| | UID = 0 | | UID = 1 | | | |
| hex | Yet-to-modulate bit string | Modulated bit string | Modulated bit string | Yet-to-modulate bit string | hex1 | hex2 |
| 0xE41 | 1001-0100-0001 | -010-010-100-100- | -010-000-000-100- | 1001-0010-000X | 0x920 | 0x921 |
| 0xA41 | 1010-0100-0001 | -010-010-100-100- | -010-000-000-100- | 1010-0010-000X | 0xA20 | 0xA21 |
| 0xD41 | 1101-0100-0001 | -010-010-100-100- | -010-000-000-100- | 1101-0010-000X | 0xD20 | 0xD21 |
| 0xE41 | 1110-0100-0001 | -010-010-100-100- | -010-000-000-100- | 1110-0010-000X | 0xE20 | 0xE21 |
| 0xB41 | 1101-0100-0001 | -010-010-100-100- | -010-000-000-100- | 1101-0010-000X | 0xB20 | 0xB21 |
| 0xF41 | 1111-0100-0001 | -010-010-100-100- | -010-000-000-100- | 1111-0010-000X | 0xF20 | 0xF21 |

FIG.15

| termination 2bits | polarity control 2bits | UID bits 8bits | parity 2 |
|---|---|---|---|
| 01<br>10<br>11 | 01<br>10<br>11 | 01100011 | 00<br>01<br>10<br>11 |

| Determination of preceding polarity | Bit selection corresponding to polarity | 010 - 001 - 010 - 100<br>↓ NRZ-NRZI conversion<br>001 - 111 - 001 - 100<br>4T  -2T-2T |
|---|---|---|

FIG.16

| 1st column | 2nd column (UID = 0) | | 3rd column (UID = 1) | | 4th column | |
|---|---|---|---|---|---|---|
| hex | Yet-to-modulate bit string | Modulated bit string | Yet-to-modulate bit string | Modulated bit string | hex1 | hex2 |
| 0x963 | 1001-0110-0011 | -010-010-100-100--010-000-000-100- | 1001-0010-000X | -010-000-000-100- | 0x920 | 0x921 |
| 0xA63 | 1010-0110-0011 | -010-010-100-100--010-000-000-100- | 1010-0010-000X | -010-000-000-100- | 0xA20 | 0xA21 |
| 0xD63 | 1101-0110-0011 | -010-010-100-100--010-000-000-100- | 1101-0010-000X | -010-000-000-100- | 0xD20 | 0xD21 |
| 0xE63 | 1110-0110-0011 | -010-010-100-100--010-000-000-100- | 1110-0010-000X | -010-000-000-100- | 0xE20 | 0xE21 |
| 0xB63 | 1101-0110-0011 | -010-010-100-100--010-000-000-100- | 1101-0010-000X | -010-000-000-100- | 0xB20 | 0xB21 |
| 0xF63 | 1111-0110-0011 | -010-010-100-100--010-000-000-100- | 1111-0010-000X | -010-000-000-100- | 0xF20 | 0xF21 |

READ-ONLY OPTICAL RECORDING MEDIUM ON WHICH UNIQUE IDENTIFICATION INFORMATION IS WRITTEN

TECHNICAL FIELD

The present invention relates to a read-only optical recording medium to which unique identification information can be written and a management method intended for writing, to a read-only optical recording medium, identification information unique to the medium.

This application claims the priority of the Japanese Patent Application No. 2004-125893 filed in the Japanese Patent Office on Apr. 21, 2004, the entirety of which is incorporated by reference herein.

BACKGROUND ART

The read-only optical recording media such as a CD (Compact Disk), DVD (Digital Versatile Disk), etc. are well known as information recording media to which information such as copyrighted music and video works can be recorded via modulation. Read-only recording media to which content such as a music work, video work or the like is recorded should be warranted for no difference in quality from one medium to another. This warranty is achieved by forming first a single master and replicating read-only recording media one after another on the basis of the single master.

Especially, a large number of disk-shaped read-only optical recording media each having recorded therein, as a pit-land-pit pattern on a substrate, a digital signal resulted from conversion of the same content information, such as a CD or DVD, can be produced at a time by replicating a single master. Therefore, the disk-shaped read-only optical recording medium is more advantageous in less deterioration of the master during replication, considerably easier replication, shorter time for replication and lower cost than the other recording media using a rewritable recording medium as a read-only recording medium, such as a tape cassette and video tape cassette for video tape recorders.

On the other hand, it is not always desirable in light of the medium management that only the same information can be written to all media, which is because the media cannot be distinguished from each other. The "medium management" is originally required for the quality control at the side of the medium manufacturer. However, since distribution of CDs and DVDs copied with no legitimate right has recently become a serious problem, the medium management has become more and more important for management of read-only recording media against illegal copying as well as for management of the copyright on the content of the medium.

The problem in the medium management against illegal copying lies in that no distinction can be made between a genuine medium and illegal copy of the medium because of the aforementioned characteristic of the read-only recording medium.

To solve the above problem, there has been proposed to record unique information unique to each of read-only recording media. An illegal copy of a recording medium having recorded therein unique information, namely, information different from one to another medium, will carry no such unique information or will not successfully be played. Therefore, this measure will be very effective for prevention of illegal copying or the like.

For the above reason, it is necessary to record unique information to each of the read-only recording media before shipment. For this purpose, an information recording method for this recording of unique information is necessary.

For recording unique information to each of read-only recording media, it is known to mark or attach a bar code carrying the unique information on the surface or like of the read-only recording medium. However, the bar code is easy to forge and is recorded separately from a part of the medium where information such as content is recorded. Therefore, a more effective method than the bar code recording has been demanded.

For postscription of identification information to the medium part where information such as a content is recorded, there has been proposed a medium management method using the Postscribed ID (trademark) developed by the SONY DISC TECHNOLOGY etc.

The method developed by the SONY DISC TECHNOLOGY is such that a large number of optical recording media such as a CD is produced once, by a stamper, from a material that can be melted with postscribing light to form a reflecting layer as a recording layer, and then a predetermined portion (land) of a pit-land-pit pattern formed on a recording track on each of optical recording media is irradiated with high-power laser light to pit the predetermined land portion.

More specifically, with such a land portion to be pitted being set in a plurality of places on the read-only recording medium, it is judged based on information unique to the recording medium whether each of such land portions should be pitted or left as the land, and each land portion is irradiated with laser light on the basis of the result of judgment, to thereby postscribe unique identification information at a part of the recording medium where actual information such as a content or the like is recorded.

The existence of the above-mentioned bar code on the recording medium is visually known. Since the medium-unique information written on the recording medium as above cannot visually be known, however, the recording medium thus produced by the method proposed by the SONY DISC TECHNOLOGY is not easily forgeable. Also, since the medium-unique information is recorded on the recording track, any special reading system is not necessary. Therefore, different from the appending of medium-unique identification information as a bar code, the medium management proposed by the SONY DISC TECHNOLOGY is suitable for the quality control as well as for the information management etc.

However, since the recording medium playing apparatus should detect where the identification signal is recorded, the land portion to be pitted has to be predetermined on the recording medium and a data row, if any, formed not in compliance with the modulation rule after the land portion is pitted will make it impossible to play back the recording medium.

Recording rules used in conjunction with the EFM (Eight-Fourteen Modulation) technique or the EFM plus modulation technique normally adopted in the CD and DVD to solve the above problems of the related art are proposed in the Japanese Patent Laid Open Nos. 2003-141742 and -151145.

DISCLOSURE OF THE INVENTION

Recently, however, there has been proposed an optical disk higher in recording density and thus larger in capacity than the CD and DVD and from which data is read with a light beam of about 405 nm in wavelength.

Since the optical disk improved in recording density and thus in capacity as above can record a large volume of data, an illegal copy of the optical disk will bring to an irrecoverably large detriment to the holder of the copyright for a content recorded in the disk.

The above-mentioned high recording-density, high-capacity optical disk adopts the 1-7 parity storage modulation technique. Different from the fixed bit length modulation technique such as the EFM technique or EFM plus modulation technique, the 1-7 parity storage modulation technique is featured by the fact that it uses a variable-length unit of modulation and information for parity storage is appended before modulated. Because of these features, it is more difficult to form a land, where identification information can be postscribed, in a predetermined position in the recording medium adopting the 1-7 parity storage modulation technique than in the recording medium employing the EFM and the like.

Further, in case the 1-7 parity storage modulation technique is adopted for modulation of the information, information before and after the information cannot freely be changed even if a land is formed in the predetermined position. That is, it is difficult to manage a recording medium having different contents recorded therein.

Therefore, it is necessary to provide an information block only for recording unique information, and only the block will not be processed for reproduction. For example, if an information block only for recording unique information is thus formed, no information can be recorded in this block and thus the capacity of recording information usable as user information will be reduced.

Moreover, exclusion of only the information block from the reproducing processing reveals that special information is recorded in the information block, which will be undesirable. For example, by detecting a signal for recording to the information block, the special information recorded in the information block will be reproducible, which will make clear the information unique to the medium and thus make it possible to make an illegal copy of the medium.

It is therefore desirable to provide an optical recording medium to which identification information unique to the medium can be postscribed into an actual bit string and which is improved in concealment of the unique identification information so that the identification information cannot illegally be extracted, and an identification information management method intended for writing, for example, the medium-unique identification information to a read-only optical recording medium.

According an embodiment of the present invention, there is provided a read-only optical recording medium adopting a logical format for managing data with an error correction block including a predetermined amount of information and an error correction code for the information in the predetermined amount and a physical format for forming lands and pits on a recording track correspondingly to a modulated bit string generated by making a predetermined modulation of an information bit row, wherein a postscript area having a predetermined postscript pattern formed therein is provided in a plurality of predetermined positions on the recording track, the postscript pattern formed in the postscript area takes the form of a pit-land-pit pattern, modulated bit strings before and after the pit-land-pit postscript pattern are formed so that the entire modulated bit string complies with the rule of the variable-length modulation even when it is replaced as a whole with a pit-only pattern, the land in the middle of the pit-land-pit postscript pattern is formed not to be physically changed when irradiated with laser light having a reading-level power but will show a reflectivity equal to that of the pit when irradiated with laser light having a power higher than the reading-level one, and the number of the postscript areas provided in one error correction block is within such a range that even if all the information bit strings resulted from modulation of the postscript pattern portion are erroneous, the error will be canceled by the error correction code.

According to another embodiment of the present invention, there is provided an identification information management method intended for recording, to a read-only optical recording medium adopting a logical format for managing data with an error correction block including a predetermined amount of information and an error correction code for the information in the predetermined amount and a physical format for forming lands and pits on a recording track correspondingly to a modulated bit string generated by making a predetermined modulation of an information bit row, identification information unique to the medium, the method including the steps of:

setting a postscript area having a predetermined postscript pattern formed therein in a plurality of predetermined positions on the recording track;

shaping the postscript pattern formed in the postscript area as a pit-land-pit pattern;

generating modulated bit strings before and after the pit-land-pit postscript pattern so that the entire modulated bit string complies with the rule of the variable-length modulation even when it is replaced as a whole with a pit-only pattern;

forming the land in the middle of the pit-land-pit postscript pattern from a material which will not physically be changed when irradiated with laser light having a reading-level power but will show a reflectivity equal to that of the pit when irradiated with laser light having a power higher than the reading-level one;

recording identification information, represented by a bit value identifiable depending upon whether a pit-land-pit postscript pattern or a pit-only postscript pattern exists in the postscript areas set in the plurality of predetermined positions, by irradiating laser light having a power higher than the reading-level one; and setting the number of the postscript areas provided in one error correction block within such a range that even if all the information bit strings resulted from modulation of the postscript pattern portion are erroneous, the error will be canceled by the error correction code.

According to the present invention, a postscript area having a predetermined postscript pattern formed therein is formed in a plurality of predetermined positions on the recording track of the read-only optical recording medium. Modulated bit strings before and after the postscript pattern are formed to comply with the rule of the variable-length modulation even when the pit-land-pit postscript pattern portion is replaced as a whole with a pit-only pattern, and the land in the middle of the postscript pattern is formed not to be physically changed when irradiated with laser light having a reading-level power but will show a reflectivity equal to that of the pit when irradiated with laser light having a power higher than the reading-level one.

Also according to the present invention, the number of the postscript areas provided in one error correction block is set within such a range that even if all the information bit strings resulted from modulation of the postscript pattern portion are erroneous, the error will be canceled by the error correction code. Thus, even if it is illegally tried to extract the identification information, the identification information in consideration will be canceled by the error correction so that the concealment of the identification information can be improved.

The foregoing and other features, aspects and advantages of the present invention will be come apparent from the following detailed description of embodiments of the present invention when taken in conjunction with the accompanying drawings.

BRIEF DESCRIPTION OF THE DRAWINGS

FIG. 3 also shows a format of error correction code (ECC).

FIG. 4 shows a format of BIS cluster.

FIG. 5 shows the relation between a physical cluster and linking area.

FIG. 10 shows an example in which two UID generation bit strings are provided in one data frame.

FIG. 11 shows an example in which one UID generation bit string is provided in one data frame.

FIG. 12 shows a 1-7 parity storage modulation table.

FIG. 13 shows a frame sync signal for a data frame.

FIG. 14 shows an example UID generation bit string for generation of a 3T-2T-3T postscript pattern.

FIG. 15 shows information produced by demodulating a result of 1-7 parity storage modulation of UID generation bit string for 3T-2T-3T.

FIG. 16 shows an example UID generation bit string for generation of a 4T-2T-2T postscript pattern.

FIG. 17 shows information produced by demodulating a result of 1-7 parity storage modulation of UID generation bit string for 4T-2T-2T.

BEST MODE FOR CARRYING OUT THE INVENTION

The present invention will be described in detail below concerning an optical disk, apparatus for manufacturing the optical disk and an apparatus for playing the optical disk as embodiments thereof with reference to the accompanying drawings.

Optical Disk

The physical properties of an optical disk 1 as an embodiment of the present invention will be explained below with reference to FIG. 1.

Figure 1A:
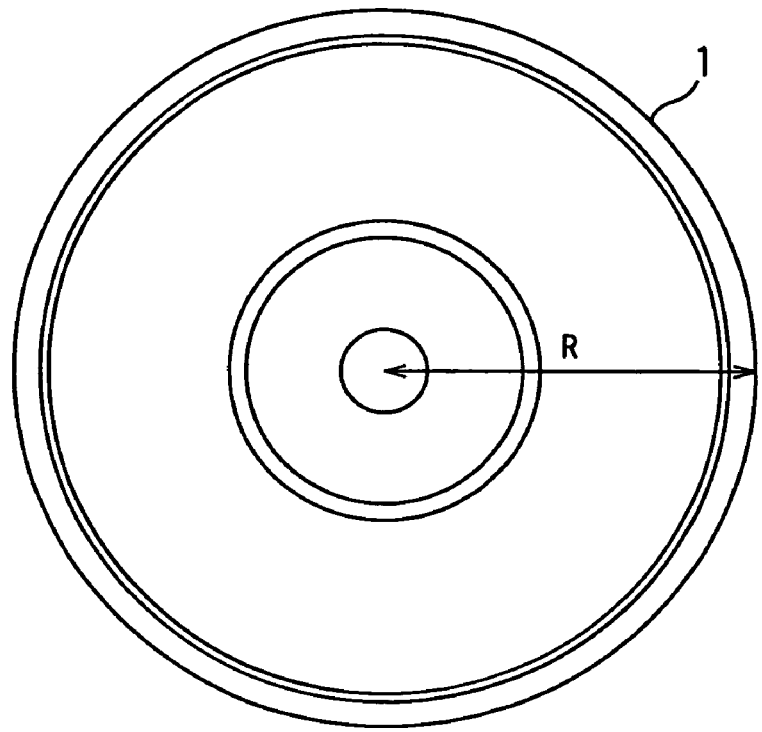
FIG. 1A is a plan view of an example optical disk according to an embodiment of the present invention and FIG. 1B is a fragmentary perspective view, enlarged in scale, of the optical disk in FIG. 1A, showing a pit pattern.
Figure 1B:
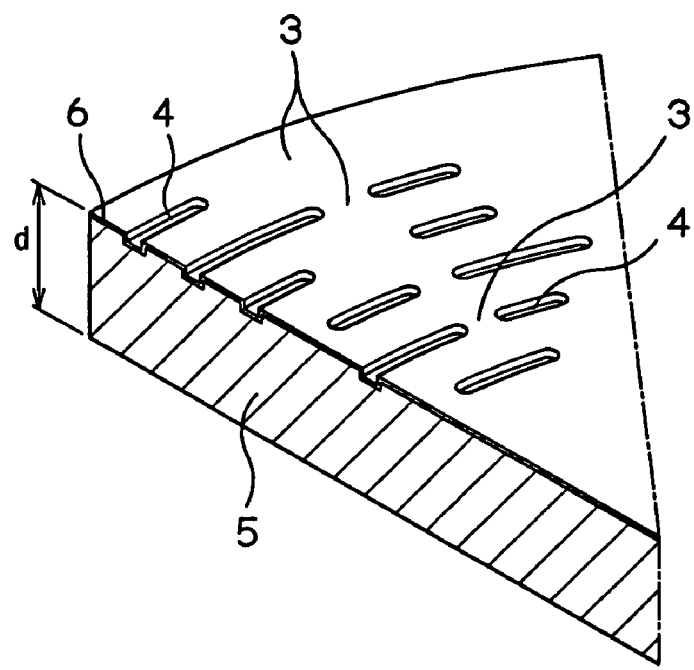

The optical disk 1 is a read-only one improved in recording density and thus larger in capacity and from which data is read with a light beam of about 405 nm in wavelength. As shown in FIGS. 1A and 1B, the optical disk 1 is 60 nm in radius R and 12 mm in thickness d.

For reading data recorded in the optical disk 1, a blue-violet laser is used which emits laser light of 405 nm in wavelength. To condense and focus the laser light emitted from the laser onto a signal recording surface of the optical disk 1, there is used an objective lens which has a numerical aperture (NA) is 0.85.

As shown in FIG. 1B, the optical disk 1 has a bottom 3 at which the laser light is reflected. Data is written by forming concavities 4 along a recording track. More specifically, a series of concavities and convexities corresponding to a bit string of data to be recorded is formed on the recording track. The concavity 4 formed on the bottom 3 of the recording track will be referred to as "pit" and the rest of the bottom 3 of the recording track other than the pits be referred to as "land", hereunder.

Also, the optical disk 1 includes a substrate 5 made of a light-transmissive synthetic resin such as polycarbonate, acrylic or the like, a highly reflective film 6 stacked on the substrate 5, and a protective layer stacked on the reflecting film 6. For reading data from the optical disk 1, the optical disk 1 is irradiated with a light beam through the protective layer.

Note here that the reflecting film 6 is formed from a material having physical properties which will not be changed even when it is irradiated with laser light having a normal reading-level power. The material is also such that a portion of the reflecting film 6, irradiated with laser light having a sufficiently higher power than the reading level, will be melted and become even in reflectivity with the pits. Namely, the material is such that the land irradiated with high-power laser light will be taken as a pit. A normal optical recording medium has a reflecting layer formed from aluminum. However, the optical disk 1 has a reflecting layer formed from an alloy of aluminum and titanium, alloy of aluminum and another element, alloy including silver or the like.

Further, since the optical disk 1 is produced by imprinting a land-and-pit pattern with a stamper or the like, a large number of the same optical disks 1 can be produced. Each optical disk 1 has unique identification information (will be referred to as "unique ID" or "UID" hereunder) recorded thereto after having the land-and-pit pattern imprinted thereon. The UID is recorded by presetting, in predetermined positions on a recording track on the disk, a plurality of postscript areas where a land portion can be pitted by irradiating high-power laser light, selecting a predetermined one of all the postscript areas correspondingly to the content of the unique ID, and irradiating high-power laser light to the land portion in the predetermined position in the selected postscript area to pit the land portion.

Format of the Optical Disk

Data recorded on the optical disk 1 is managed according to a predetermined logical pattern and predetermined physical pattern. The logical format is characterized in that user information is subjected to Reed-Solomon code-based error-correction coding. The physical pattern is characterized in that information thus subjected to the error-correction coding is coded via the 1-7 parity storage modulation and also to NRZ-NRZI conversion.

Logical Format:

First, the logical format will be explained.

In the logical format for the optical disk 1, all information to be recorded to the optical disk 1 are divided into data groups each of 64 kB, each data group is subjected to error detection, and a correction code is appended to the data group to form a basic unit of data called "ECC cluster".

Figure 2:
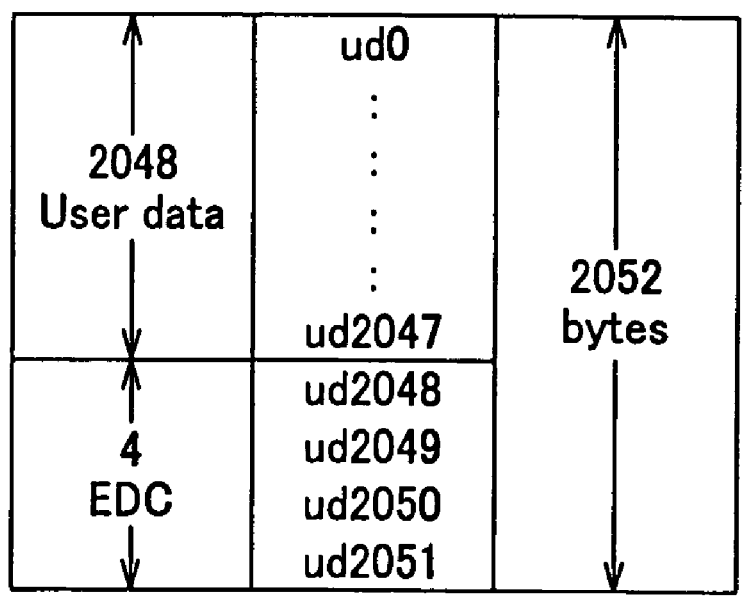
FIG. 2 shows a format of error detection code (EDC).

The ECC cluster is composed as will be described in detail below. First, the data group of 64 kB is sub-divided into 32 data groups each of 2048 bytes and an error detection code (EDC) of 4 bytes is appended to each data group of 2048 bytes to provide data groups each of 2052 bytes in total as shown in FIG. 2. It should be noted that a polynomial for generation of the error detection code (EDC) is given by the following equation 1:

$$EDC(x) = \sum_{i=31}^{0} b_i x^i = I(x) \mod G(x) \qquad \text{[Equation 1]}$$

$$I(x) = \sum_{i=16415}^{32} b_i x^i$$

$$G(x) = x^{32} + x^{31} + x^4 + 1$$

Then, the information is subjected to predetermined scrambling in each of the 32 data groups each of 2052 bytes to restore the information to the data group (32×2052 bytes). Next, the data group of 32×2052 bytes is sub-divided into 304 data groups each of 216 bytes in size as shown in FIG. 3. Then, a 32-byte error correction code is appended to each of the sub-divided data groups. Finally, the information is subjected to predetermined interleaving to complete the ECC cluster.

Note that the error correction code to be appended to the ECC cluster uses a Reed-Solomon coding given by the following equation 2:

$$p(x) = x^8 + x^4 + x^3 + x^2 + 1 \qquad \text{[Equation 2]}$$

$$g(x) = \prod_{i=0}^{31} (x = \alpha^i)$$

$$\alpha = 00000010$$

With the Reed-Solomon coding, error correction is made in units of a byte. The number of bytes error-correctable with the Reed-Solomon coding is generally a half of the number of the error correction codes. Since the ECC cluster has appended a 32 byte Reed-Solomon correction code to the 216 byte data group, it is possible to make error correction of a maximum of 16 bytes of the 216 bytes. An error of 16 to 248 bytes can be corrected in respect of density.

Also, for the optical disk 1, there is available a data unit called "BIS cluster" in addition to the ECC cluster. The "BIS cluster" is a data unit in which there are recorded a number for an ECC cluster, called "address", number for a block in the ECC cluster and a number indicative of the function of information recorded in the ECC cluster, called "user control".

The BIS cluster is composed as will be described in detail below. First, an address is formed from 4-byte information indicative of an address number, 1-byte information as data to be appended, and a 4-byte Reed-Solomon error correction code. Next, 24 data groups each of 30 bytes is formed from a combination of such 9-byte address information and 21-byte user control. Then, 32-byte error correction code is added to each of the 30-byte data groups, and finally the information is rearranged by making predetermined interleaving thereof to complete a BIS cluster as shown in FIG. 4. The polynomial for generation of the error correction code to be appended to the BIS cluster is given by the following equation 3:

$$p(x) = x^8 + x^4 + x^3 + x^2 + 1 \qquad \text{[Equation 3]}$$

$$g(x) = \prod_{i=0}^{31} (x = \alpha^i)$$

$$\alpha = 00000010$$

Physical Format:

Next, the physical format will be explained.

As shown in FIG. 5, the physical layer of the optical disk 1 is formed so that there will appear repeatedly a physical cluster in which data is recorded as a combination of an ECC cluster and BIS cluster and two parts linking the physical clusters to each other.

Figure 6:
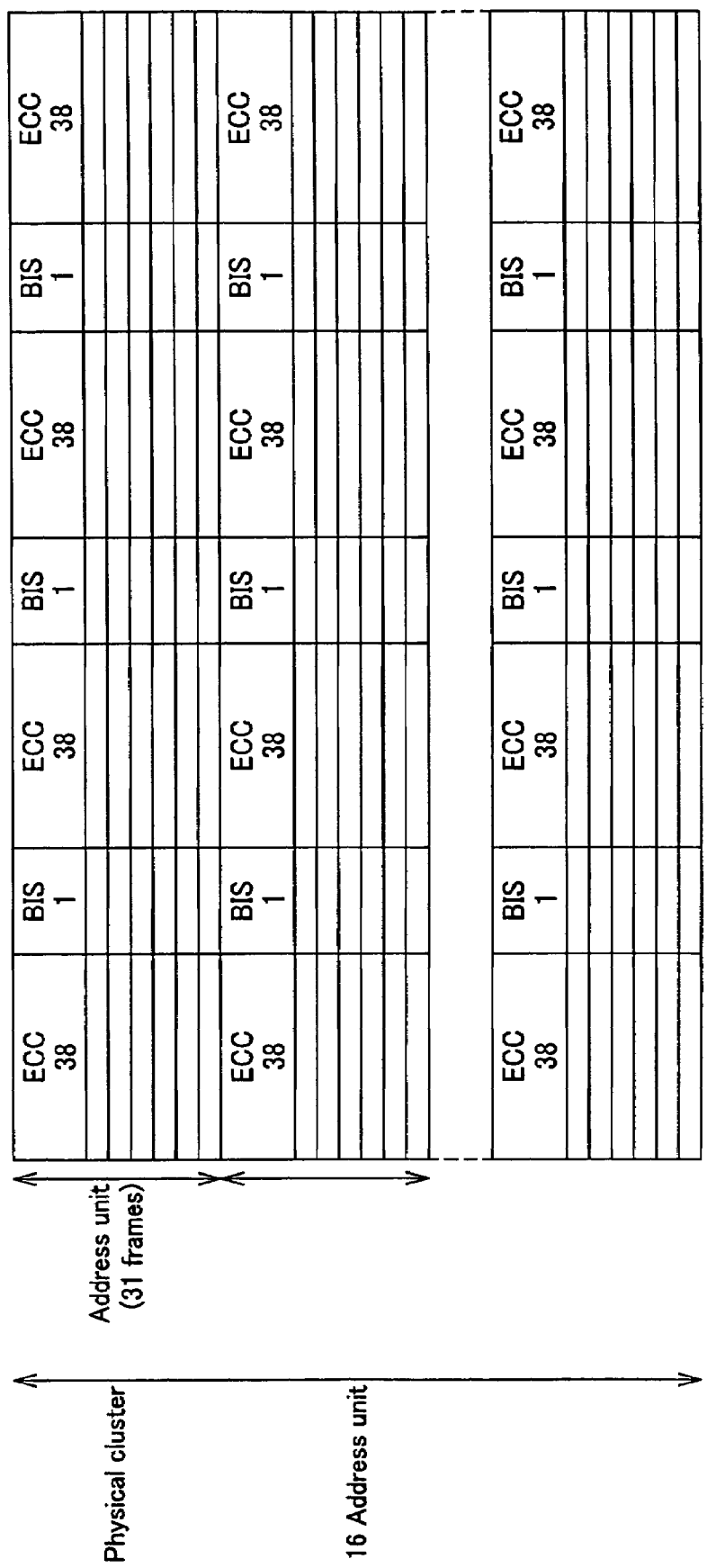
FIG. 6 shows a data structure of the physical cluster.

As shown in FIG. 6, the physical cluster is divided into 16 blocks called "address unit" and each address unit is divided into 31 data frames. Each of the linking parts is formed from 2 data frames.

Figure 7:
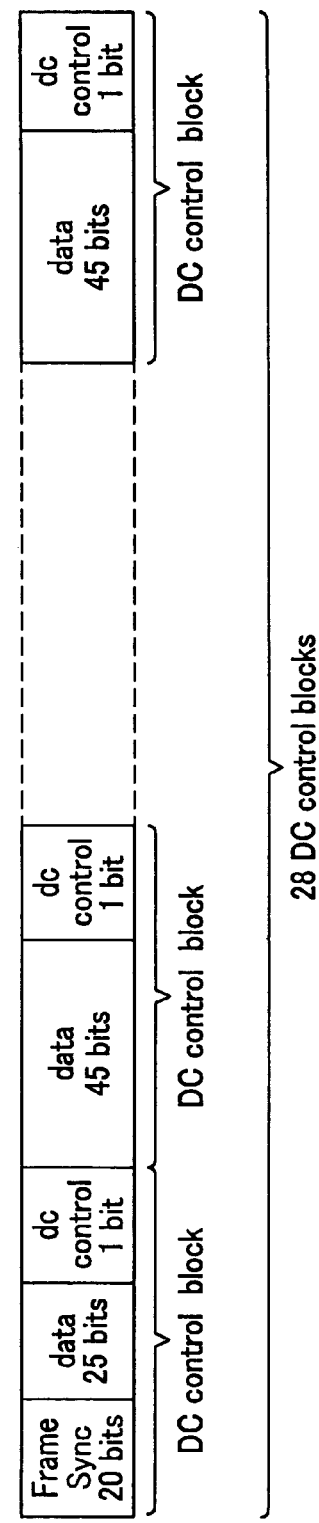
FIGS. 7A to 7C show data structures of data frame.

As shown in FIG. 7A, 155-byte information is recorded in the data frame. Of the data in the data frame, three bytes including the 39th, 78th and 117th ones are information in the BIS cluster and the remaining 152 bytes are information in the ECC cluster. It should be noted that the BIS cluster includes address data and user control data and the address data is included in the BIS clusters in the first three data frames in each address unit while the user control data is included in the BIS clusters in the remaining data frames.

As shown in FIG. 7B, actual data in each data frame consists of a total of 28 data groups including a leading one of 25 bits and other ones each of 45 bits.

As shown in FIG. 7C, the data frame consists of a total of 28 DC control blocks including a leading one formed from a 20-bit frame sync signal, 25-bit actual data and 1-bit DC control bit, and other ones each formed from a 45-bit actual data and 1-bit DC control bit.

Note that the 1-bit DC control bit at the end of each DC control block is determined in value so that the absolute value of an index digital sum value (DSV) indicative of the size of a DC component resulted from addition with the modulated bit values of "0" and "1" put in correspondence with "−1" and "1", respectively, will be approximate to "0".

UID Generation Bit String:

Next, the UID generation bit string will be explained.

Figure 8:
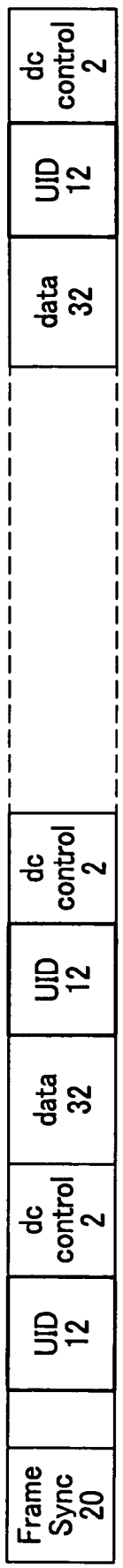
FIG. 8 shows a UID generation bit string provided in a DC control block.

As shown in FIG. 8, recording data is arranged in the optical disk 1, so that a bit string (UID generation bit string) having a predetermined number of bits (12 bits (before 1-7 parity storage modulation), for example) for forming a postscript area for identification information unique to the recording medium is formed in a predetermined DC control block. More specifically, the optical disk 1 has formed therein a UID generation bit string in a predetermined position for forming a postscript area in which a unique ID is to be postscribed by irradiating high-power laser light to a disk formed by stamper.

The UID generation bit string is to generate a pit-land-pit postscript pattern (will be described in detail later) after the 1-7 parity storage modulation and NRZ-NRZI conversion.

The UID generation bit string is not provided in all the DC control blocks but in only a specific DC control block. For example, a predetermined one or a plurality of predetermined ones of the physical clusters is selected, and a UID generation bit string is formed in a DC control block of some data frames in the selected physical cluster. Also, the UID generation bit string is not formed in all the DC control blocks of the data frame but only in some of the DC control blocks.

FIG. 8 shows positions, where UID generation bit strings are formed, in a DC control block.

The UID generation bit strings are formed in predetermined positions in a DC control block.

According to this embodiment, the UID generation bit string is provided at an end portion, other than DC control bits, of the DC control block. This disposition of the UID generation bit string at the end portion of the DC control block permits to have no influence on the BID cluster.

Note that a DC control bit string is of 2 bits as shown in FIG. 8 because the 1-7 parity storage modulation is effected in units of 2 bits.

For example, in case the UID generation bit string is of 12 bits (before modulation), the UID generation bit strings are formed in positions between the 33rd bit and 44th bit (before modulation) from the top of the DC control block.

The above UID generation bit string should be formed so that the optical disk 1 will not be a one not in compliance with the aforementioned logical and physical formats.

There will be explained a pit-land-pit postscript pattern generated by making 1-7 parity storage modulation and NRZ-NRZI conversion of the UID generation bit string.

Figure 9A:
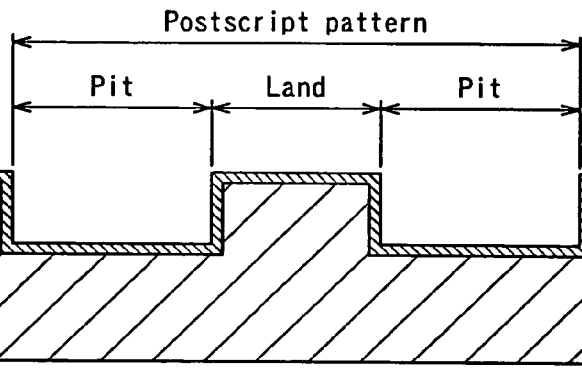
FIG. 9A is a fragmentary sectional view of the optical disk, showing a postscript pattern before the reflecting film is melted.
Figure 9B:
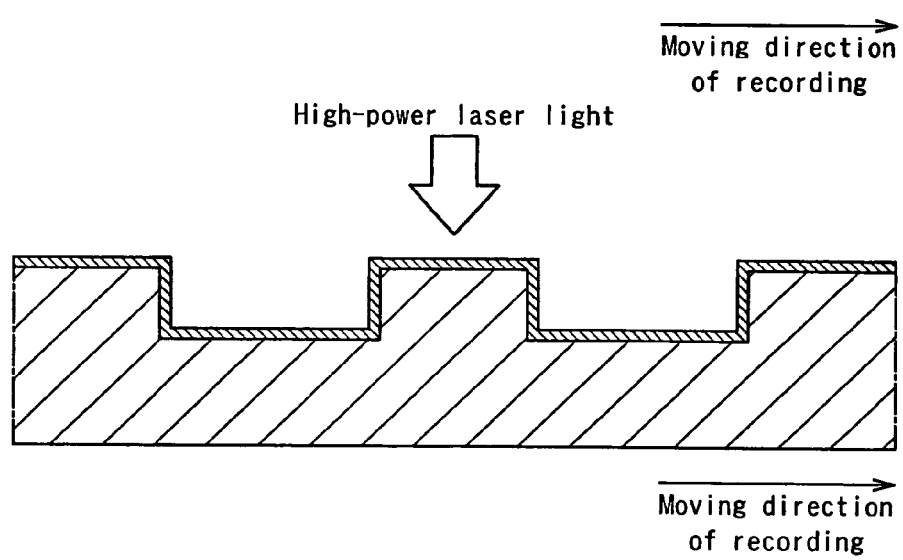
FIG. 9B is also a fragmentary sectional view of the optical disk, showing irradiation of laser light to the postscript pattern.
Figure 9C:
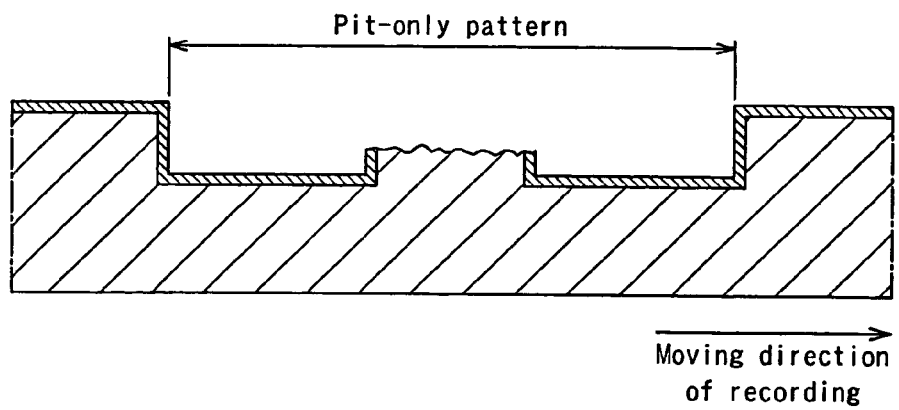
FIG. 9C is a fragmentary sectional view of the optical disk, showing the postscript pattern after the reflecting film is melted.

With the 1-7 parity storage modulation and NRZ-NRZI conversion of the UID generation bit string, a pit-land-pit pattern is formed in a plurality of predetermined positions on the recording track of the optical disk 1 as shown in FIG. 9A. This postscript pattern is to record an unique ID to the optical disk 1 by melting and thus pitting the middle land by irradiating high-power laser light to that land as shown in FIG. 9B to form a generally pit-pit-pit pattern as shown in FIG. 9C. FIG. 9 shows a substrate which is also melted. However, it is considered that the reflecting film is melted in practice.

Note that the postscript pattern may not be of all pit-land-pit configurations but should meet all the following requirements:

(1) The postscript pattern should be a pit-land-pit one.

(2) The length of the postscript pattern should be smaller than the largest code length after the 1-7 parity storage modulation and NRZ-NRZI conversion and more than 3 times larger than the smallest code length after the 1-7 parity storage modulation and NRZ-NRZI conversion. That is, since the largest code length is 8T and smallest code length is 2T (T is the length of one bit in the modulated bit string), the length of the postscript pattern is 6T, 7T or 8T.

(3) All the modulated bit strings before and after a postscript pattern should be formed for compliance with the rules of the 1-7 parity storage modulation and NRZ-NRZI conversion even when the postscript pattern has been replaced with a bit-only pattern.

When a postscript pattern is formed to meet the above-mentioned requirements, data complying with the rule of the 1-7 parity storage modulation will have been recorded in the optical disk 1 also after the middle land is melted and pitted. That is, pitting the middle land will not result in any bit string which is not in compliance with the rule of the 1-7 parity storage modulation in relation to patterns before and after the postscript pattern.

The postscript patterns meeting the above requirements include the following pit-land-pit ones:

4T-2T-2T, 2T-4T-2T, 2T-2T-4T, 2T-3T-3T, 3T-2T-3T, 3T-3T-2T, 3T-2T-2T, 2T-3T-2T, 2T-2T-3T and 2T-2T-2T (where "T" is the length of a bit in one modulated bit string)

Particularly, in case the land in middle of the pit-land-pit postscript pattern is of 2T, 2T is the smallest code length in the 1-7 parity storage modulation, which leads to a smallest energy required for melting and high efficiency of melting.

Further, the middle land in the 3T-2T-3T postscript pattern is of 2T. Thus, 2T is the smallest code length in the 1-7 parity storage modulation, which leads to a smallest energy required for melting and high efficiency of melting. Since the position margin before and after the position of postscript is widest. Namely, this postscript pattern is very desirable in shape.

Also, the middle land in the 4T-2T-2T postscript pattern is of 2T. Thus, 2T is the smallest code length in the 1-7 parity storage modulation, which leads to a smallest energy required for melting and high efficiency of melting. Also, the waste heat at the time of postscription is effectively utilizable. Namely, this postscript pattern is very desirable in shape.

Disposition of the Postscript Pattern

In the optical disk 1, one postscript pattern is recorded in one DC control block.

However, it should be noted that the postscript pattern is not provided in all the DC control blocks but it is provided only in a specific one of the DC control blocks.

It is assumed here that the middle land in the pit-land-pit postscript pattern is melted to form a pit-land-pit pattern in order to record a unique ID. In case normal data reproduction is made, the melted land will be recognized as an error. In case the UID generation bit string is of 12 bits, if the UID generation bit string as it is an error, the error will be of 3 bytes at maximum.

In case a postscript pattern is provided in all the DC control blocks in the ECC cluster and all the postscript patterns are determined to be erroneous, the whole ECC cluster will has an error of 3×28×31×16 bytes at maximum. Since of 152 bytes of one frame, 3 bytes by 28 blocks are erroneous, the error density will be 3×28/152.

In the logical format of the optical disk 1, the correctable error density is 16/248. Therefore, in case a postscript pattern is provided in all the DC control blocks of the ECC cluster, an error largely exceeding the correctable error density will take place.

In the optical disk 1, the postscript pattern is provided for the error not to be beyond the correctable error range.

The number n of postscript patterns provided in one data frame should meet the requirements given by the expression (11) below:

$$3 \times n/152 > 16/248 \tag{11}$$

That is, when n<3, the postscript pattern can be formed not to be beyond the correctable error range. Therefore, in the optical disk 1, the number of the postscript patterns should be less than 3 on average in one data frame.

For the above purpose, an area where UID generation bits are formed for generation of the pit-land-pit pattern should be provided in only one of 10 DC control blocks while normal information should be recorded in other control blocks.

Also, two UID generation bit strings may be provided in one data frame as shown in FIG. 10, for example. Otherwise, one UID generation bit strong may be provided in one data frame as shown in FIG. 11. For example, in case two UID generation bit strings are provided in one data frame, the number of errors accordingly caused after coding is about 7 on average, namely, it is not over the correctable error range (16 bytes) even if a variation in number of the errors due to interleaving or the like is counted in, which has already been proved by the prior simulation.

In the optical disk 1, the postscript pattern is provided for the error not to be beyond the correctable error range. Thus, the identification information written in the postscript pattern will be canceled by the error correction during a normal reproduction. So, the concealment of the unique ID recorded in the optical disk 1 can be improved.

Note that effective information such as a content, application or the like should desirably be recorded in the ECC block to which UID is to be recorded. The effective information thus recorded will make it unclear where the unique ID is recorded in the medium and adds to the concealment of the unique ID.

Further, information of which the removal will make it impossible to read any application or content, such as FAT, table of contents or the like, may be recorded in the ECC block. Since the medium-unique identification information is essential for reading other information, removal thereof from an illegal copy preventive block will make it impossible to read the other information even if it is illegally tried to remove the illegal copy preventive block.

Concrete Examples of UID Generation Bit String

Next, there will be explained concrete examples of 12-bit yet-to-be-modulated UID generation bit string for generation of 3T-2T-3T and 4T-2T-2T postscript patterns.

First, the 1-7 parity storage modulation will be explained.

FIG. 12 shows a 1-7 parity storage modulation table. "xx" in the 1-7 parity storage modulation table in FIG. 12 means that "x" takes either a value 0 or 1. Also, "(-fs)" in FIG. 10 indicates a frame sync bit string.

FIG. 13 shows a frame sync signal. In FIG. 13, "#" is "1" only when the yet-to-be-modulated bit string before the frame sync is attained is "00" or "0000" and it is "0" in other cases.

With reference to the 1-7 parity storage modulation table, there will be explained the 12-bit (yet-to-be-modulated) UID generation bit string for generation of the 3T-2T-3T and 4T-2T-2T postscript patterns.

3T-2T-3T:

First, the 3T-2T-3T postscript pattern will be explained.

FIG. 14 shows a 12-bit UID generation bit string for generation of the 3T-2T-3T (pit-land-pit) postscript pattern in which a unique ID is recorded in the optical disk 1.

As shown in FIG. 14, the 12-bit UID generation bit string includes a 2-bit modulation termination bit string (termination) at the top, 2-bit polarity control bit string (polarity control) and an 8-bit UID bit string (UID bit) at the end. It should be noted that in FIG. 14, a 2-bit bit string (parity) next to the UID bit string is to generate a DC control bit.

Since the unit of modulation is not constant in the 1-7 parity storage modulation, an end portion, in the unit of modulation, of data preceding the postscript pattern has to be formed to assure successful generation of the 3T-2T-3T pit-land-pit postscript pattern. The modulation termination bit string (termination) including the first and second bits in the 12-bit UID generation bit string corresponds to a last portion of the unit of modulation of data preceding the UID bit string. That is, the modulation termination bit string is formed to accurately terminate the 1-7 parity storage modulation of the preceding bit string so that the preceding bit string will not have any influence on the modulation of the subsequent modulation termination bit string and UID bit string.

The modulation termination bit string (termination) at the top is any of 01, 10 and 11 as will be known by referencing to the last 2 bits of the yet-to-be-modulated bit string shown in FIG. 12.

The 8 bits including from the fifth to twelfth bits of the 12-bit UID generation bit string are UID bits for generation of the 3T-2T-3T pattern.

More specifically, the UID bit is "01000001" as in the modulated bit string in FIG. 12. It should be noted that the 8 UID bits including from the fifth to twelfth bits are subjected to the 1-7 parity storage modulation under the assumption that the modulation of the bits including the first to fourth bits have been terminated. Thus, a bit string generated by making the 1-7 parity storage modulation of the UID bits will be "010-010-100-100". Further NRZ-NRZI conversion of the bit string results in "001-110-011-100". The values 0 and 1 of the bit string after subjected to the NRZ-NRZI conversion correspond to a land and pit, respectively. The bit string after subjected to the NRZ-NRZI conversion is 2T-3T-2T-3T-2T. The pattern of the third to tenth bits is 3T-2T-3T. That is, the 3T-2T-3T pattern is a postscript pattern. Therefore, the bits of the pit-land-pit postscript pattern are 57th and 58th bits after the 1-7 parity storage modulation and NRZ-NRZI conversion.

The polarity control bit strings as the third and fourth bits of the 12-bit UID generation bit string are polarity control bits whose value is controlled, depending upon whether the last bit after the 1-7 parity storage modulation and NRZ-NRZI conversion of the first and second bits, so that the 3T-2T-3T postscript pattern generated subsequently will be a pit-land-pit pattern.

That is, the run length is determined based on the 3T-2T-3T pattern generated based on the UID bit, but it is uncertain due to the influence of the NRZ-NRZI conversion whether the 3T-2T-3T pattern is a pit-land-pit one or a land-pit-land one.

Thus, the fact that in case the 1-7 parity storage modulation can be terminated at the first 2-bit modulation termination bit string, a polarity can be determined upon which it depends whether the bit value at a time elapse to the first 2-bit modulation termination bit string corresponds to a land or a pit is utilized to judge, based on the polarity control bit string, whether the 3T-2T-3T pattern is a pit-land-pit or land-pit-land one.

More specifically, in case the polarity control bit string is "01" or "11", the polarity is inverted 2 times. Also, in case the polarity control bit string is "10", the polarity is inverted once. Therefore, the bit when the modulation of the modulation termination bit string is a land, the polarity control bit string is "10". In case the bit when the modulation of the modulation termination bit string is a pit, the polarity control bit string is "01" or "11".

Note that as will be known from the 1-7 parity storage modulation table in FIG. 12, each of the 2-bit bit strings "01", "10" and "11" is not always the end of the unit of modulation in the 1-7 parity storage modulation. For example, the 2-bit string "01" will not be the end of modulation when the subsequent bit is "11". The 2-bit string "10" will not be the end of the unit of modulation when the subsequent bit is "11". The 2-bit string "11" will not be the end of modulation when the subsequent but is "0111".

Therefore, in the 12-bit UID generating bit string, the bit just before the polarity control bit should be the end of modulation of the preceding data to determine the polarity, and the polarity control bit itself should be modulated as the end of the modulated data before the aforementioned pattern is modulated in order to always generate the 3T-2T-3T pattern.

Concrete values for generation of a 3T-2T-3T pattern:

More specifically, the 12-bit UID generation bit strings meeting the aforementioned requirements for generation of a 3T-2T-3T (pit-land-pit) pattern include the following:

Group A 0x541, 0x641, 0x941, 0xA41, 0xD41 and 0xE41

Group B 0xB41 and 0xf41

Note that the portion "OOO" of the above "oxOOO" is expressed in hexadecimal numeral.

The group A includes 12-bit UID generation bit strings of such a type that the polarity of the modulated bits after the first 2 bits of the 12 bits have been modulated is inverted, while the group B includes 12-bit UID generation bit strings of such a type that the polarity of the modulated bits after the first 2 bits of the 12 bits have been modulated is maintained.

Therefore, for inversion of the polarity of the modulated bits after the first 2 bits of the 12 bits are modulated, one of the bit strings included in the group A should be selected and inserted into the yet-to-be-modulated bring string. For maintaining the polarity, one of the bit strings in the group B should be inserted in the yet-to-be-modulated bit string.

By inserting the above 12-bit UID generation bit string into the yet-to-be-modulated bit string as above, a 3T-2T-3T (pit-land-pit) postscript pattern can be formed in a predetermined position in the DC block.

Also, one of the bit strings in each of the groups A and B is selected to form the following four pairs (a) to (d):

| (a) | (A) 0x941 | (B) 0xB41 |
|---|---|---|
| (b) | (A) 0xA41 | (B) 0xB41 |
| (c) | (A) 0xD41 | (B) 0xF41 |
| (d) | (A) 0xE41 | (B) 0xF41 |

These pairs are different only in third bit from each other.

Any one of these bit strings is disposed in a predetermined position in relation to, for example, an information bit string just before subjected to the 1-7 parity storage modulation.

Then, the above information is modulated down to the second bit thereof as a mass by the 1-7 parity storage modulation, and it is examined whether the 3T-2T-3T postscript pattern is a pit-land-pit one. In case the pattern is a pit-land-pit one, the third bit is maintained as it is. If the 3T-2T-3T postscript pattern is not any pit-land-pit one, the third bit is inverted. That is, the third bit is replaced with the other bit string in pair with that bit.

By completing three steps, namely, a step in which the polarity of the first two bits is determined, a step in which the polarity from this portion is controlled with next two bits and a step in which 2T in middle of the 3T-2T-3T is a land, when generating a to-be-recorded data row to the optical disk 1, a 3T-2T-3T pit-land-pit pattern can be generated in a predetermined position (in the last portion of the DC block, for example).

FIG. 15 shows a table including a record of identification information UID=1 resulted from the 1-7 parity storage modulation of the bit strings 0x941, 0xB41, 0xA41, 0xD41, 0xF41 and 0xE41 appearing in the aforementioned 4 types of pairs, and demodulated result of the identification information.

The first column at the left of the table in FIG. 15 shows 6 types of UID generation bit strings appearing as the above 4 pairs. These bit strings are to be selected correspondingly to the polarity information of the land and pits when the information is modulated down to the second bit thereof so that the "2T" of 3T-2T-3T is a land.

The second column shows the result of a modulation, made based on the modulation table in FIG. 12, of the UID generation bit string in the first column. The third column shows the occurrence of a pit of 8T as the result of postscription to a land in the generated 3T-2T-3T pit-land-pit combination. The result of modulation is subjected to NRZI conversion and inversion of the converted state between the second and third columns in order to associate the modulation result with a pit and land, which however will not be described herein.

The fourth column shows the result of 1-7 parity storage demodulation of the third column. In the fourth column, there are two types of candidate information, whichever is selected depending upon what the information following an area where unique information is recorded is.

In this table shown in FIG. 13, the portion to the left of the center may be regarded as bit strings (UID=0) in the identification information area when no postscript is made, and it may also be regarded as bit strings (UID=1) in the identification information area when a postscript is made. That is, the table can be used to make sure the correspondence between the bit value "0" or "1" of the identification information and the pattern of the bit string in the identification information area when the bit value is "0" or "1".

4T-2T-2T:

Next the 4T-2T-2T postscript pattern will be explained.

FIG. 16 shows a 12-bit UID generation bit string for generation of the 4T-2T-2T (pit-land-pit) postscript pattern in which a unique ID is recorded in the optical disk 1.

As shown in FIG. 16, the 12-bit UID generation bit string includes a 2-bit modulation termination bit string (termination) at the top, 2-bit polarity control bit string (polarity control) and an 8-bit UID bit string (UID bit) at the end. It should be noted that in FIG. 16, a 2-bit bit string (parity) next to the UID bit string is to generate a DC control bit.

The 2-bit modulation termination bit string (termination) at the top and next 2-bit polarity control bit string are similar in function and content to the 3T-2T-3T pattern.

The 8 bits including from the fifth to twelfth bits of the 12-bit UID generation bit string are UID bits for generation of the 4T-2T-2T pattern.

More specifically, the UID bit is "01100011" as in the modulated bit string in FIG. 12. It should be noted that the 8 UID bits including from the fifth to twelfth bits are subjected to the 1-7 parity storage modulation under the assumption that the modulation of the bits including the first to fourth bits have been terminated. Thus, a bit string generated by the 1-7 parity storage modulation of the UID bits will be "010-001-010-100". Further NRZ-NRZI conversion of the bit string results in "001-111-001-100". The values 0 and 1 of the bit string after subjected to the NRZ-NRZI conversion correspond to a land and pit, respectively. The bit string after subjected to the NRZ-NRZI conversion is 2T-4T-2T-2T-2T. The pattern of the third to tenth bits is 4T-2T-2T. That is, the 4T-2T-2T pattern is a postscript pattern. Therefore, the bits of the pit-land-pit postscript pattern are 58th and 59th bits after the 1-7 parity storage modulation and NRZ-NRZI conversion.

Concrete Values for Generation of a 4T-2T-2T pattern:

More specifically, the 12-bit UID generation bit strings meeting the aforementioned requirements for generation of a 4T-2T-2T (pit-land-pit) pattern include the following eight ones:

Group A 0x563, 0x663, 0x963, 0xA63, 0xD63 and 0xE63

Group B 0xB63 and 0xf63

Note that the portion "OOO" of the above "oxOOO" is expressed in hexadecimal numeral.

The group A includes 12-bit UID generation bit strings of such a type that the polarity of the modulated bits after the first 2 bits of the 12 bits have been modulated is inverted, while the group B includes 12-bit UID generation bit strings of such a type that the polarity of the modulated bits after the first 2 bits of the 12 bits have been modulated is maintained.

Therefore, for inversion of the polarity of the modulated bits after the first 2 bits of the 12 bits have been modulated, one of the bit strings included in the group A should be selected and inserted into the yet-to-be-modulated bring string. For maintaining the polarity, one of the bit strings in the group B should be inserted into the yet-to-be-modulated bit string.

By inserting the above 12-bit UID generation bit string into the yet-to-be-modulated bit string as above, a 4T-2T-2T (pit-land-pit) postscript pattern can be formed in a predetermined position in the DC block.

Also, one of each of the bit strings in the groups A and B is selected to form the following four pairs (a) to (d):

| | | |
|---|---|---|
| (a) | (A) 0x963 | (B) 0xB63 |
| (b) | (A) 0xA63 | (B) 0xB63 |
| (c) | (A) 0xD63 | (B) 0xF63 |
| (d) | (A) 0xE63 | (B) 0xF63 |

These pairs are different only in third bit from each other.

Any one of these bit strings is disposed in a predetermined position in relation to, for example, an information bit string just before subjected to the 1-7 parity storage modulation.

Then, the above information is modulated down to the second bit thereof as a mass by the 1-7 parity storage modulation, and it is examined whether the 4T-2T-2T postscript pattern is a pit-land-pit one. In case the pattern is a pit-land-pit one, the third bit is maintained as it is. If the 4T-2T-2T postscript pattern is not any pit-land-pit one, the third bit is inverted. That is, the third bit is replaced with the other bit string in pair with that bit.

By completing three steps, namely, a step in which the polarity of the first two bits is determined, a step in which the polarity from this portion is controlled with next two bits and a step in which 2T in middle of the 4T-2T-2T is a land, when generating a recording data row to the optical disk 1, a 4T-2T-2T pit-land-pit pattern can be generated in a predetermined position (in the last portion of the DC block, for example).

FIG. 17 shows a table including record of identification information UID=1 resulted from the 1-7 parity storage modulation of the bit strings 0x961, 0xB61, 0xA61, 0xD61, 0xF61 and 0xE61 appearing in the aforementioned 4 types of pairs, and demodulated identification information.

The first column at the left of the table in FIG. 17 shows 6 types of UID generation bit strings appearing as the above 4 pairs. These bit strings are to be selected correspondingly to the polarity information of the land and pits when up to the second bit is modulated so that the "2T" of 4T-2T-2T is a land.

The second column shows the result of a modulation, made based on the modulation table in FIG. 12, of the UID generation bit string in the first column. The third column shows the occurrence of a pit of 8T as the result of postscription to a land in the generated 4T-2T-2T pit-land-pit combination. The result of modulation is subjected to NRZI conversion and inversion of the converted state between the second and third columns in order to associate the modulation result with a pit and land, which however will not be described herein.

The fourth column shows the result of 1-7 parity storage demodulation of the third column. In the fourth column, there are two types of candidate information, whichever is selected depending upon what the information following an area where unique information is recorded is.

In this table shown in FIG. 17, the portion to the left of the center may be regarded as bit strings (UID=0) in the identification information area when no postscript is made, and it may also be regarded as bit strings (UID=1) in the identification information area when a postscript is made. That is, the table can be used to make sure the correspondence between the bit value "0" or "1" of the identification information and the pattern of the bit string in the identification information area when the bit value is "0" or "1".

Method of Manufacturing the Optical Disk 1

Figure 18:
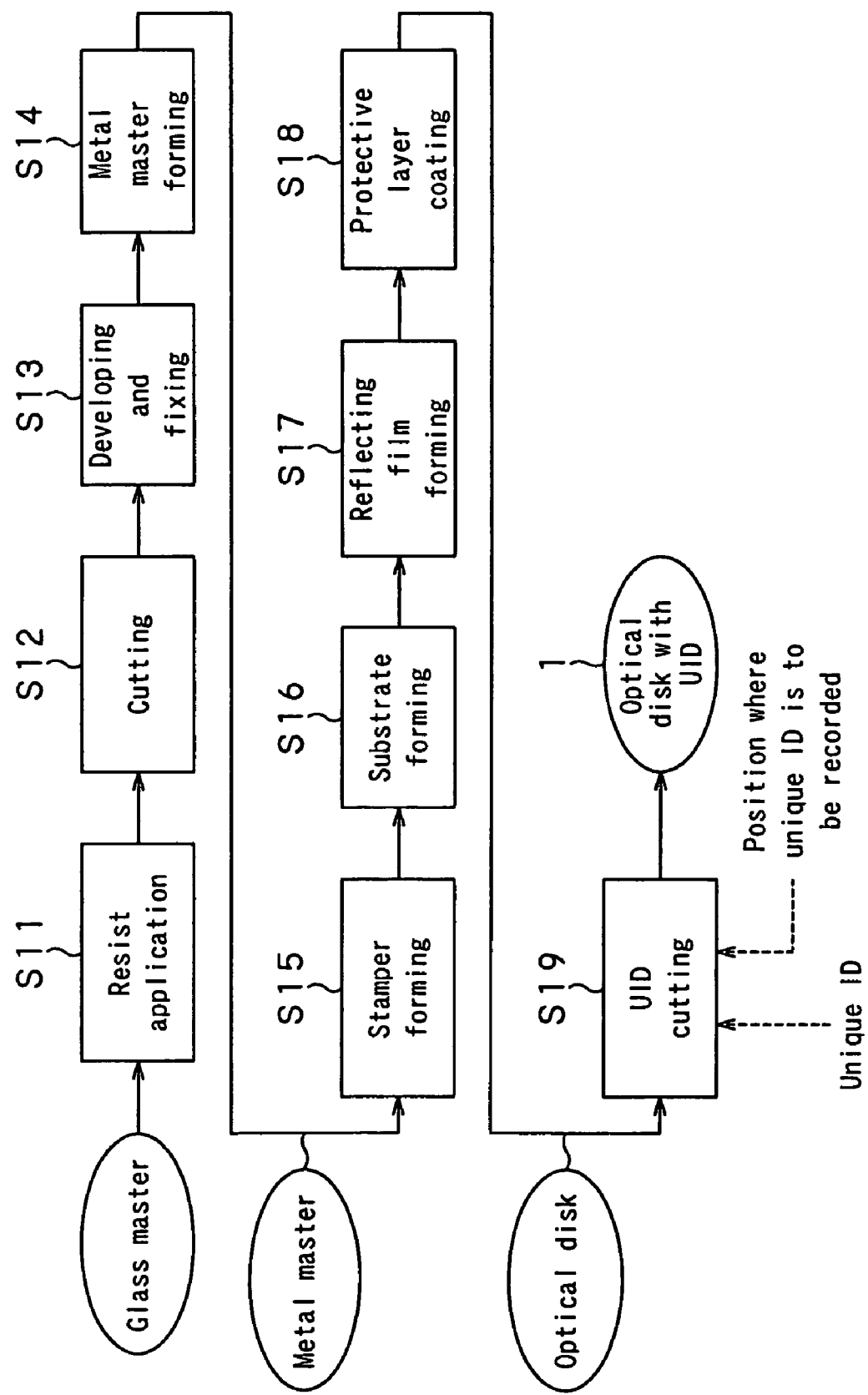
FIG. 18 shows a flow of operations made in manufacturing the optical disk according to the embodiment of the present invention.

The optical disk 1 is produced as will be described below:

As shown in FIG. 18, the method of manufacturing the optical disk 1 includes a resist application step S11, cutting step S12, development and fixation step S13, metal master forming step S14. A metal master is formed through these steps.

In the resist application step S11, a glass master is coated with photoresist. In the cutting step S12, laser light switched correspondingly to bit strings is irradiated to the photoresist to form a pit-land-pit pattern. In the development and fixation step S13, the photoresist in which the pit-land-pit pattern is formed is developed and fixed on the glass master. In the metal master forming step S14, the glass master is electrolytically plated to form a metal master.

Next, the metal master thus formed is processed through a stamper forming step S15 and substrate forming step S16 to provide a disk substrate. In the stamper forming step S15, the metal master is used to form a stamper. In the substrate forming step S16, an injection molder is used to form a disk substrate from polycarbonate or acrylic resin with the stamper being disposed within a mold.

The disk substrate thus formed has imprinted thereto a pit-land-pit pattern having been formed in the master in the cutting step S12.

Next, a read-only optical disk 1 is produced through a reflecting film forming step S17 and protective layer forming step S18. In the reflecting film forming step S17, a reflecting film is formed, by sputtering or the like, on the surface of the disk substrate where the pit pattern has been formed. In the optical disk 1, medium-unique identification information is recorded on this reflecting film. It should be noted that to form the optical disk 1, the reflecting film should be able to have also medium-unique identification information recorded thermally thereon in addition to ordinary bit information. Therefore, the reflecting film should be formed from an alloy of aluminum generally used to form the reflecting film and also another element such as titanium, for example. In the protective layer coating step S18, a protective layer is formed on the reflecting film. In this step, the protective layer is formed by coating a UV-curable resin on the reflecting film by spin coating and irradiating UV rays to the UV-curable resin coating. It should be noted that information can be read from the thus formed optical disk 1 by irradiating reading laser light from the side of the protective layer.

Next, the read-only optical disk 1 formed as above is subjected to a UID cutting step S19. In this UID cutting step S19, high-power laser light is irradiated to the middle land in the pit-land-pit postscript pattern in each postscript area to write an individual unique ID to each of the optical disks 1 thus formed.

Thus, the optical disks 1 each having the unique ID written thereon are produced.

A UID cutting apparatus 20 used in the UID cutting step 19 will be explained below with reference to FIG. 19.

The UID cutting apparatus 20 is to postscribe an unique ID to each of the mass-produced optical disks 1 of the same type.

Figure 19:
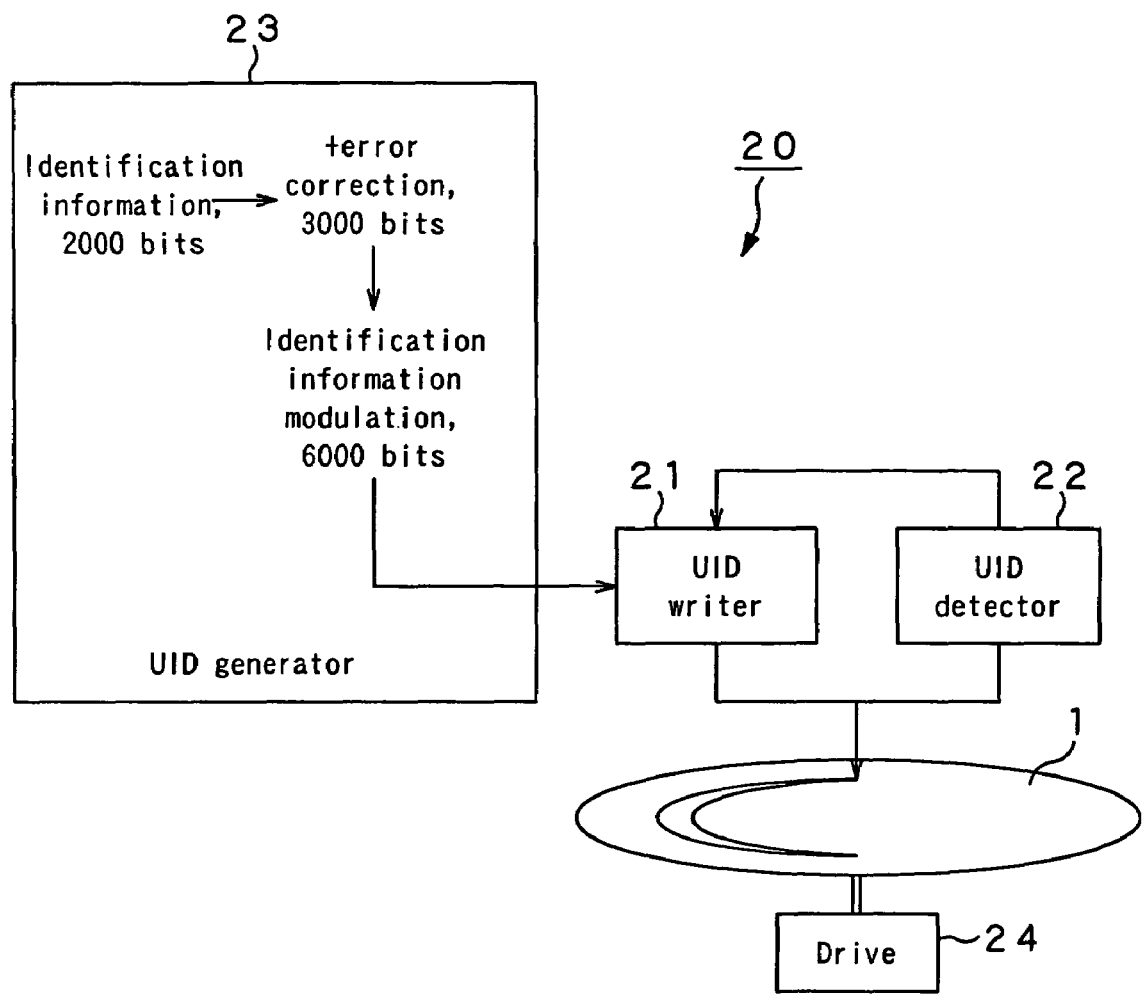
FIG. 19 is a block diagram of an embodiment of UID cutting apparatus according to the present invention.

As shown in FIG. 19, the UID cutting apparatus 20 includes a UID writer 21 to melt a land portion of the pit-land-pit postscript pattern where an UID can be postscribed by irradiating sufficiently higher-power laser light than the normal reading laser light to the optical disk 1, UID detector 22 to detect the position of the pit-land-pit postscript pattern by reading a signal recorded in the optical disk 1, UID generator 23 to generate a unique ID, and a drive 24 to drive the rotation of the optical disk 1.

The UID writer 21 makes switching for irradiation, or for no irradiation, of the laser light to the postscript pattern correspondingly to the unique-ID bit string generated by the UID generator 23. The unique-ID bit string provided from the UID generator 23 is a modulated bit string supplied from an external memory unit incorporated in a computer or the like, for example.

In the UID cutting apparatus 20, the drive 24 rotates the optical disk 1 slowly. At this time, the laser light is slowly traced along the recording track on the optical disk 1. Thus, the UID detector 22 can detect a pit-land-pit postscript pattern in a predetermined position on the recording track.

When the UID detector 22 has detected a postscript pattern, the UID writer 21 irradiates high-power laser light to the middle land. At this time, however, the UID writer 21 makes switching for irradiation, or for no irradiation, of the laser light correspondingly to the bit value generated by the UID generator 23. That is, in case the a bit value "1" is to be recorded to the detected postscript pattern, the UID writer 21 makes switching for irradiation of the laser light. In case the bit value "0" is to be recorded, the UID writer 21 makes switching for no irradiation of the laser light.

The UID writer 21 records a bit value to each of a plurality of postscript patterns provided in the optical disk 1 as above. Thus, a unique ID can be postscribed to the optical disk 1.

The information amount of the unique ID to be recorded to the optical disk 1 will be considered below. It is assumed that the initial information amount of the unique ID is 2000 bits. First, an error correction bit is added to the information by an error correction encoding circuit. The error correction encoding circuit may be a circuit using a BCH encoding algorithm, for example. Thus, a 3000-bit unique ID having an error correction bit, for example, is generated. Next, a 3000-bit modulation will be considered. Here will be explained a modulation of "0" to "01" and "1" to "10", for example. Thus, the unit ID will be of 6000 bits.

Figure 20:
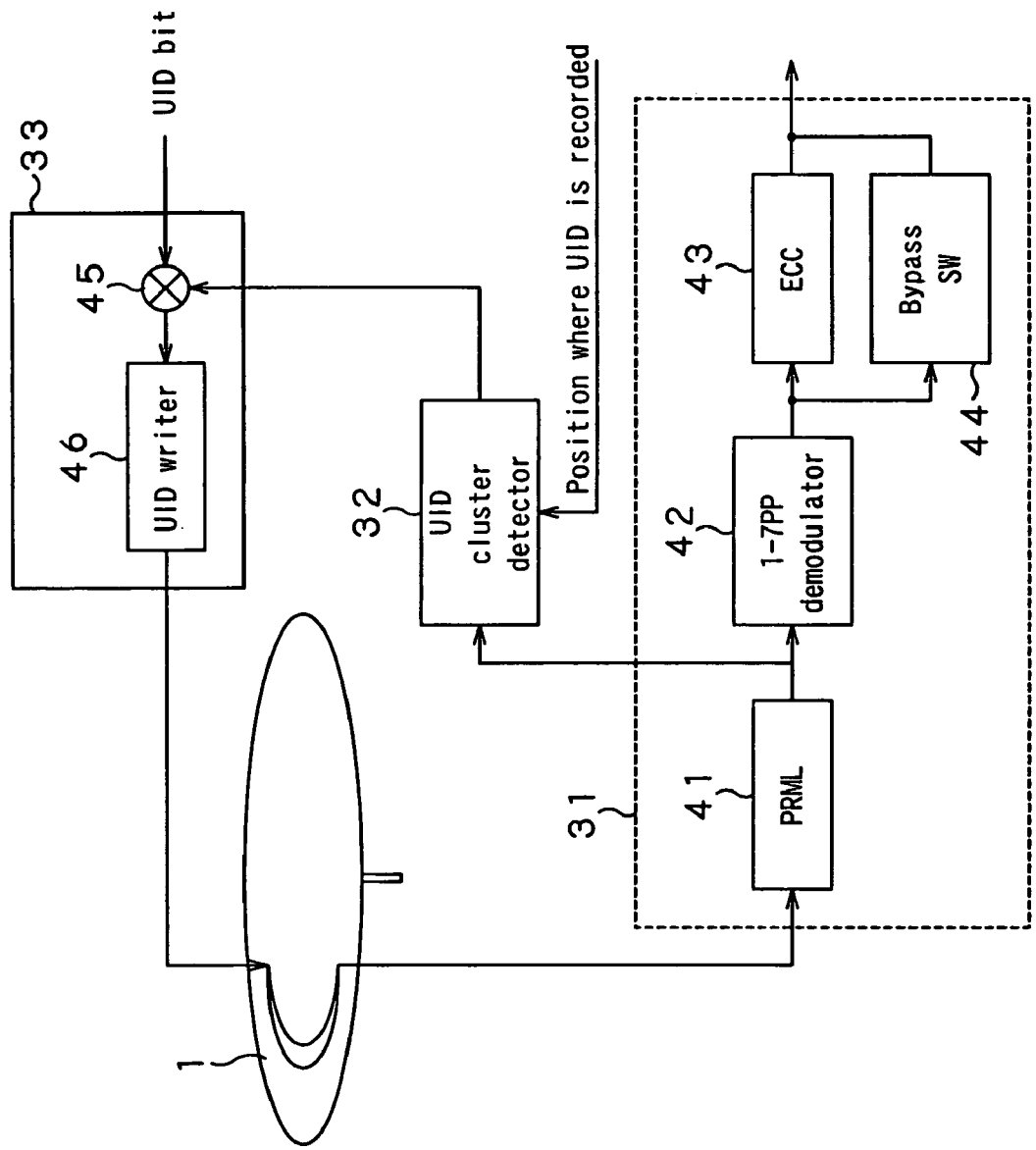
FIG. 20 is a further detailed block diagram of the UID cutting apparatus.

The UID writer 21 and UID detector 22 in the UID cutting apparatus 20 are constructed as will be described in detail below with reference to FIG. 20.

As shown, the UID cutting apparatus 20 includes a signal reading system 31, postscript pattern detector 32 and writing unit 33.

The signal reading system 31 includes a PRML equalization circuit 41 to equalize PRML of a signal read from the optical disk 1 to a target one and detect PRML data, 1-7 PP demodulation circuit 42 to demodulate the read data row detected by the PRML equalization circuit and which has been modulated by the 1-7 parity storage modulation, ECC decoder 43 to make ECC correction of the read data row demodulated from the 1-7 parity storage modulated state, and a bypass switch 44 to output the read data row demodulated from the 1-7 parity storage modulated state without being error-corrected.

The read data outputted from the signal reading system 31 without being error-corrected and read data subjected to error correction are outputted to an external computer or the like, for example. The external computer detects the position of the UID generation bit string including a pit-land-pit postscript pattern on the basis of these read data, and feeds back the detected position to the postscript pattern generator 32.

The postscript pattern detector 32 is supplied with the data row equalized in PRML and position of the UID generation bit string outputted from the external computer. The postscript pattern detector 32 generates, from this information, a pulse for identification of the position of the middle land in the pit-land-pit postscript pattern.

The writing unit 33 includes a multiplier 45 and laser drive 46.

The multiplier 45 is supplied with the land position identification pulse generated by the postscript pattern detector 32 and the bit value of the unique ID generated by the UID generator, and multiplies them together.

The laser drive 46 irradiates high-power laser light to the optical disk 1 at a time a signal "1" is supplied from the multiplier 45, that is, when the land position identification pulse is supplied and a bit value "1" is written to the postscript pattern. At a time other than this timing, the laser drive 46 irradiates normal reading-power laser light to the optical disk 1.

Note that to detect a position where a unique ID is to be recorded, a special bit spring is recorded at the top of the physical cluster, for example. With the special bit string being stored in a unique ID recording unit, the UID cutting apparatus 20 can search the read bit string for a bit string matching the postscript pattern and thus easily detect, in the read bit string, the position of the position where the unique ID is recorded. After the top of the physical cluster is detected, a pulse signal is to be outputted which makes a switching for irradiating laser light in a predetermined timing. The pulse signal is to make switching for laser light irradiation correspondingly to a bit value of identification information corresponding to a predetermined area to be irradiated with laser light. The pulse signal is first generated in a first frame containing no address information. A signal which makes a switching for irradiation, or for no irradiation, of laser light is generated correspondingly to the bit value of identification information so that laser light can be irradiated be made for the 61st and 62nd bits of a block included in each frame.

Next, a player 50 for the optical disk 1 having UID postscribed therein will be explained below with reference to FIG. 21.

Figure 21:
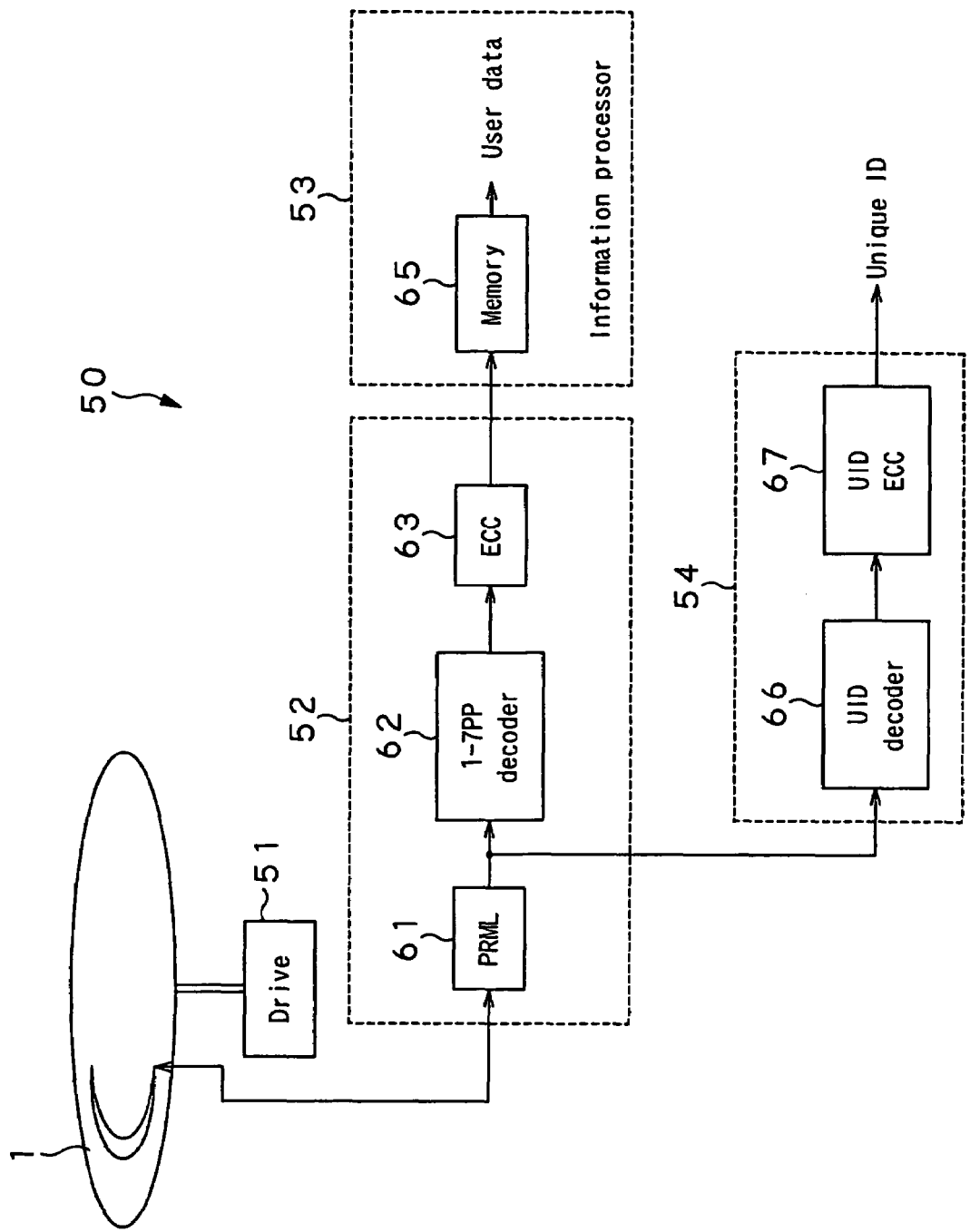
FIG. 21 is a block diagram of an embodiment of the optical disk player according to the present invention.

As shown in FIG. 21, the optical disk player 50 includes a disk drive 51 to rotate the optical disk 1, playback unit 52 to process a signal read from the optical disk 1 for reproduction, information processor 53 and a UID detector 54 to detect a UID.

The playback unit 52 includes a PRML equalization circuit 61 to equalize in PRML and binarize a signal read from the optical disk 1, 1-7 PP demodulation circuit 62 to demodulate the read data row equalized by the PRML equalization circuit 61 and which has been modulated by the 1-7 parity storage modulation, and an ECC decoder 63 to make ECC correction of the read data row demodulated from the 1-7 parity storage modulated state.

The playback unit 52 is similar in construction to the normal disk player. That is, the playback unit 52 reproduces a clock from a read signal obtained based on pit and land information read from the optical disk 1 being rotated by irradiating reading-power laser light (no shown), equalizes the signal in PRML, demodulates the 1-7 parity storage modulated signal and makes error correction of the signal, to thereby reproduce information recorded in the optical disk 1.

Information reproduced by the playback unit 52 is stored once in a memory 65 in the information processor 53, and then outputted to outside.

The UID detector 54 includes a UID decoder 86 to detect only a unique ID data row in the PRML-equalized read data, and a UID-ECC decoder 87 to make error correction of the unique ID data row.

The UID detector 54 is additionally provided in a normal playback unit to detect a unique ID. The UID detector 54 detects a special physical cluster in which a unique ID is recorded and a DC control block on the basis of the PRML-equalized and binarized bit string, and detects the state of a postscript pattern disposed in a predetermined position in the DC control block. The UID detector 54 detects whether the postscript pattern is in a "pit-land-pit" or "pit-only" state. For example, in case the postscript pattern is in the "pit-land-pit" state, the UID detector 54 judges that the bit string is "0". In case the postscript pattern is in the "pit-only" state, the UID detector 54 judges that the bit string is "1". The UID detector 54 judges all the areas in which a unique ID is recorded as above, and outputs a unique ID bit string.

With the above operations, the UID detector 54 can detect a unique ID recorded in the optical disk 1.

Note that to detect a position where a unique ID is to be recorded, a special bit spring, for example, is to be recorded at the top of the physical cluster. With the special bit string being stored in a unique ID recording unit, the player 50 can search the read bit string for a bit string matching the postscript pattern and thus easily detect, in the read bit string, the position of the position where the unique ID is recorded.

Method of Playing the Optical Disk 1

An optical disk player 70 for an optical disk 1 having a UID postscribed therein, as another embodiment of the disk player of the present invention, will be explained below with reference to FIG. 22.

Figure 22:
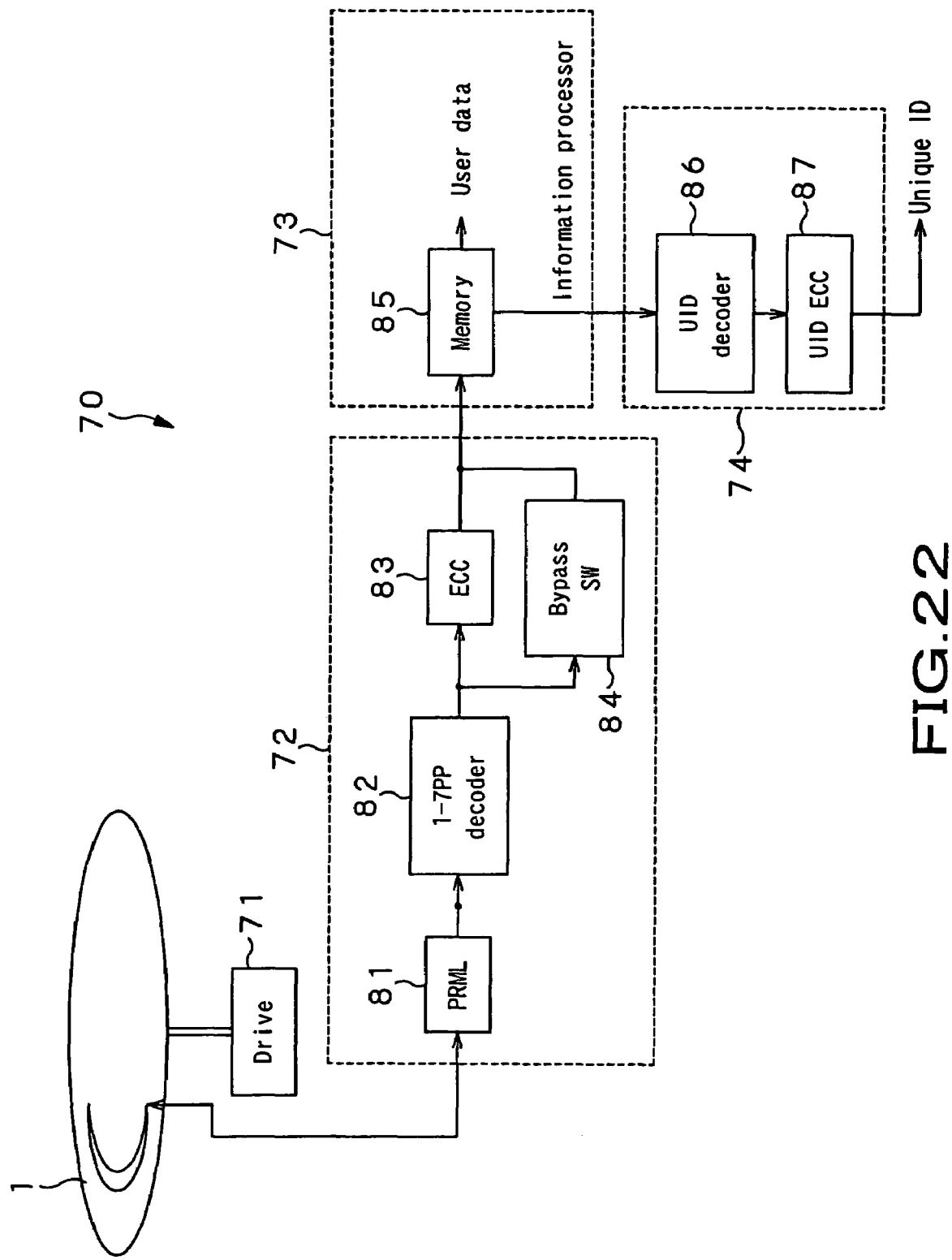
FIG. 22 is a block diagram of another embodiment of the optical disk player according to the present invention.

As shown in FIG. 22, the optical disk player 70 includes a disk drive 71 to rotate the optical disk 1, playback unit 72 to process a signal read from the optical disk 1 for reproduction, information processor 73 and a UID detector 74 to detect a UID.

The playback unit 72 includes a PRML equalization circuit 81 to equalize in PRML and binarize a signal read from the optical disk 1, 1-7 PP demodulation circuit 82 to demodulate the read data row equalized by the PRML equalization circuit 81 and which has been modulated by the 1-7 parity storage modulation, ECC decoder 83 to make error correction of the read data row demodulated from the 1-7 parity storage modulated state, and a bypass switch 84 to output the read data row demodulated from the 1-7 storage modulated state.

The playback unit 72 is different from the normal optical disk player in that it includes the bypass switch 84. At the time of a normal disk playback, the bypass switch 84 outputs a data row supplied from the ECC decoder 83 to the information processes 73 provided downstream thereof. When a unique ID has been detected, the bypass switch 84 outputs a data row not error-corrected by the ECC decoder 83 to the downstream-provided information processor 73.

Information reproduced by the playback unit 72 is stored once in a memory 85 in the information processor 73, and then outputted to outside.

The UID detector 74 includes a UID decoder 66 to detect a unique ID data row in the unique ID data row stored in the memory 85 in the information processor 73, and a UID-ECC decoder 67 to make error correction of the unique ID data row.

The UID detector 74 is additionally provided in the normal disk player to detect a unique ID. The UID detector 74 may be configured as either hardware or software that is to be executed in a CPU or the like.

The UID detector 74 detects the data content of a bit string (12-bit UID generation bit string) intended for generation of a postscript pattern for recording a unique ID in the bit string equalized in PRML and binarized and demodulated from the 1-7 parity storage modulated state. More specifically, the UID detector 74 detects whether the 12-bit UID generation bit string has a data value before postscribed, for example, a value in the first column shown in FIGS. 15 and 17 or has a data value after postscribed, for example, a value in the fourth column in FIGS. 15 and 17. It judges, based on the result of detection, whether the UID bit is "0" or "1". The UID detector 74 makes judgment over all the areas each having a unique ID recorded therein and outputs a unique ID bit string.

With the above operations, the UID detector 74 can detect a unique ID recorded in the optical disk 1.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A read-only optical recording medium adopting a logical format for managing data with an error correction block including a predetermined amount of information and an error correction code for the information in the predetermined amount and a physical format for forming lands and pits on a recording track correspondingly to a modulated bit string generated by making a predetermined modulation of an information bit row, wherein a postscript area having a predetermined postscript pattern formed therein is provided in a plurality of predetermined positions on the recording track, the postscript pattern formed in the postscript area takes the form of a pit-land-pit pattern, modulated bit strings before and after the pit-land-pit postscript pattern are formed so that the entire modulated bit string complies with the rule of a variable-length modulation even when it is replaced as a whole with a pit-only pattern, the land in the middle of the pit-land-pit postscript pattern is formed not to be physically changed when irradiated with laser light having a reading-level power but will show a reflectivity equal to that of a pit when irradiated with laser light having a power higher than the reading-level power, and the number of the postscript areas provided in one error correction block is within such a range that even if all the information bit strings resulted from modulation of the postscript pattern portion are erroneous, the error will be canceled by the error correction code.

2. The optical recording medium according to claim 1, wherein in each of the postscript areas set in the plurality of predetermined positions, there is recorded, by irradiating laser light whose power is larger than the reading-level power, identification information represented by a bit value identifiable depending upon whether the pit-land-pit postscript pattern exists in a portion of the postscript area or a pit-only pattern exists in said portion.

3. The optical recording medium according to claim 2, wherein the identification information is peculiar to the medium.

4. The optical recording medium according to claim 1, wherein the postscript area is provided in an error correction block where a medium-unique identification information is recorded, and the medium-unique identification information is such that other information recorded in the optical recording medium cannot be read unless the medium-unique identification information is read.

5. The optical recording medium according to claim 1, wherein the error correction code is Reed-Solomon code.

6. The optical recording medium according to claim 5, wherein in case error correction of less than t bytes is possible with the Reed-Solomon code per error correction block, a number of bytes in an information bit string resulted from demodulation of all the postscript patterns in one error correction block is smaller than t.

7. The optical recording medium according to claim 1, wherein the predetermined modulation is a 1-7 parity storage modulation.

8. The optical recording medium according to claim 7, wherein an identification information is managed based on the physical format formed by taking, as one frame, a data unit of 155 bytes before subjected to the 1-7 parity storage modulation, dividing the frame into 28 DC control blocks and forming the leading one of the DC control blocks in the frame from 25 bits while forming each of other DC control blocks from 45 bits, the error correction code is a Reed-Solomon code by which 16 bytes can be corrected with 32 bytes appended to 216-byte information, the postscript area is provided in a predetermined position in a predetermined DC control block, and the DC control block in which the postscript area is provided is generated one per 10 blocks.

9. The optical recording medium according to claim 8, wherein a number of DC blocks in each of which the postscript area is provided is two or less per frame.

10. The optical recording medium according to claim 8, wherein the frame includes 3-byte address information, and the postscript area is provided in other than a position where the address information is recorded.

11. The optical recording medium according to claim 1, wherein in the variable-length modulation, an identification information is subjected to a 1-7 parity storage modulation and then to NRZ-NRZI conversion.

12. The optical recording medium according to claim 11, wherein the pit-land-pit postscript pattern is 3T-2T-3T or 4T-2T-2T where T is the bit length of one modulated bit string.

13. The optical recording medium according to claim 12, wherein an information bit string includes one of the following 12-bit bit strings in order to generate the 3T-2T-3T postscript pattern 941, A41, D41, E41, B41 and F41, each of the above bits being a hexadecimal number.

14. The optical recording medium according to claim 13, wherein the identification information is managed based on the physical format formed by taking, as one frame, a data unit of 155 bytes before subjected to the 1-7 parity storage modulation, dividing the frame into 28 DC control blocks and forming the leading one of the DC control blocks in the frame from 20 bits of frame sync pattern and 25 bits of data while forming each of other DC control blocks from 45 bits, and the postscript area is recorded at bits including from the 33rd to 44th bits in a predetermined DC control block.

15. The optical recording medium according to claim 14, wherein the pits in the pit-land-pit postscript pattern in the postscript area are the 57th and 58th bits after the identification information is subjected to the 1-7 parity storage modulation and NRZ-NRZI conversion.

16. The optical recording medium according to claim 15, wherein the information bit string includes one of the following 12-bit bit strings in order to generate the 4T-2T-2T postscript pattern
963, A63, D63, E63, B63 and F63,
each of the above bits being a hexadecimal number.

17. The optical recording medium according to claim 13, wherein the identification information is managed based on the physical format formed by taking, as one frame, a data unit of 155 bytes before subjected to the 1-7 parity storage modulation, dividing the frame into 28 DC control blocks and forming the leading one of the DC control blocks in the frame from 20 bits of frame sync pattern and 25 bits of data while forming each of other DC control blocks from 45 bits, and the postscript area is recorded at bits including from the 33rd to 44th bits in a predetermined DC control block.

18. The optical recording medium according to claim 17, wherein the pits in the pit-land-pit postscript pattern in the postscript area are the 58th and 59th bits after the identification information is subjected to the 1-7 parity storage modulation and NRZ-NRZI conversion.

19. The optical recording medium according to claim 1, wherein the land in the middle of the pit-land-pit postscript pattern is not physically changed when irradiated with laser light having a reading-level power but is melted when irradiated with laser light having a power higher than the reading-level power.

20. The optical recording medium according to claim 19, wherein the land in the middle of the pit-land-pit postscript pattern is formed from aluminum or an alloy containing silver.

21. An identification information management method intended for recording, to a read-only optical recording medium adopting a logical format for managing data with an error correction block including a predetermined amount of information and an error correction code for the information in the predetermined amount and a physical format for forming lands and pits on a recording track correspondingly to a modulated bit string generated by making a predetermined modulation of an information bit row, identification information unique to the medium, the method comprising the steps of: setting a postscript area having a predetermined postscript pattern formed therein in a plurality of predetermined positions on the recording track; shaping the postscript pattern formed in the postscript area as a pit-land-pit pattern; generating modulated bit strings before and after the pit-land-pit postscript pattern so that the entire modulated bit string complies with the rule of a variable-length modulation even when it is replaced as a whole with a pit-only pattern; forming the land in the middle of the pit-land-pit postscript pattern from a material which will not physically be changed when irradiated with laser light having a reading-level power but will show a reflectivity equal to that of a pit when irradiated with laser light having a power higher than the reading-level power; recording identification information, represented by a bit value identifiable depending upon whether a pit-land-pit postscript pattern or a pit-only postscript pattern exists in the postscript areas set in the plurality of predetermined positions, by irradiating laser light having a power higher than the reading-level power; and setting the number of the postscript areas provided in one error correction block within such a range that even if all the information bit strings resulted from modulation of the postscript pattern portion are erroneous, the error will be canceled by the error correction code.

22. The identification information management method according to claim 21, wherein the identification information is unique to the medium.

23. The identification information management method according to claim 21, wherein the postscript area is provided in an error correction block where the medium-unique identification information is recorded, and the medium-unique identification information is such that other information recorded in the optical recording medium cannot be read unless the medium-unique identification information is read.

24. The identification information management method according to claim 21, wherein the error correction code is Reed-Solomon code.

25. The identification information management method according to claim 24, wherein in case error correction of less than t bytes is possible with the Reed-Solomon code per error correction block, a number of bytes in an information bit string resulted from demodulation of all the postscript patterns in one error correction block is smaller than t.

26. The identification information management method according to claim 21, wherein the predetermined modulation is a 1-7 parity storage modulation.

27. The identification information management method according to claim 26, wherein the identification information is managed based on the physical format formed by taking, as one frame, a data unit of 155 bytes before subjected to the 1-7 parity storage modulation, dividing the frame into 28 DC control blocks and forming the leading one of the DC control blocks in the frame from 20 bits of frame sync pattern and 25 bits of data while forming each of other DC control blocks from 45 bits, the error correction code is a Reed-Solomon code by which 16 bytes can be corrected with 32 bytes appended to 216-byte information, the postscript area is provided in a predetermined position in a predetermined DC control block, and the DC control block in which the postscript area is provided is generated one per 10 blocks.

28. The identification information management method according to claim 27, wherein a number of DC blocks in each of which the postscript area is provided is two or less per frame.

29. The identification information management method according to claim 27, wherein the frame includes 3-byte address information, and the postscript area is provided in other than a position where the address information is recorded.

30. The identification information management method according to claim 21, wherein in the variable-length modulation, the identification information is subjected to a 1-7 parity storage modulation and then to NRZ-NRZI conversion.

31. The identification information management method according to claim 30, wherein the pit-land-pit postscript pattern is 3T-2T-3T or 4T-2T-2T where T is the bit length of one modulated bit string.

32. The identification information management method according to claim 31, wherein an information bit string includes one of the following 12-bit bit strings in order to generate the 3T-2T-3T postscript pattern 941, A41, D41, E41, B41 and F41, each of the above bits being a hexadecimal number.

33. The identification information management method according to claim 32, wherein the identification information is managed based on the physical format formed by taking, as one frame, a data unit of 155 bytes before subjected to the 1-7 parity storage modulation, dividing the frame into 28 DC control blocks and forming the leading one of the DC control blocks in the frame from 20 bits of frame sync pattern and 25 bits of data while forming each of other DC control blocks from 45 bits, and the postscript area is recorded at bits including from the 33rd to 44th bits in a predetermined DC control block.

34. The identification information management method according to claim 33, wherein the pits in the pit-land-pit postscript pattern in the postscript area are the 57th and 58th bits after the identification information is subjected to the 1-7 parity storage modulation and NRZ-NRZI conversion.

35. The identification information management method according to claim 34, wherein the information bit string includes one of the following 12-bit bit strings in order to generate the 4T-2T-2T postscript pattern
963, A63, D63, E63, B63 and F63,
each of the above bits being a hexadecimal number.

36. The identification information management method according to claim 32, wherein the identification information is managed based on the physical format formed by taking, as one frame, a data unit of 155 bytes before subjected to the 1-7 parity storage modulation, dividing the frame into 28 DC control blocks and forming the leading one of the DC control blocks in the frame from 20 bits of frame sync pattern and 25 bits of data while forming each of other DC control blocks from 45 bits, and the postscript area is recorded at bits including from the 33rd to 44th bits in a predetermined DC control block.

37. The identification information management method according to claim 36, wherein the pits in the pit-land-pit postscript pattern in the postscript area are the 58th and 59th bits after the identification information is subjected to the 1-7 parity storage modulation and NRZ-NRZI conversion.

38. The identification information management method according to claim 21, wherein the land in the middle of the pit-land-pit postscript pattern is not physically changed when irradiated with laser light having a reading-level power but is melted when irradiated with laser light having a power higher than the reading-level power.

39. The identification information management method according to claim 38, wherein the land in the middle of the pit-land-pit postscript pattern is formed from aluminum or an alloy containing silver.

* * * * *